(12) United States Patent
Seery et al.

(10) Patent No.: US 10,135,387 B2
(45) Date of Patent: Nov. 20, 2018

(54) PHOTOVOLTAIC MOUNTING SYSTEM WITH SEALANT INJECTOR INLET

(71) Applicant: SolarCity Corporation, San Mateo, CA (US)

(72) Inventors: Martin Seery, San Rafael, CA (US); Garret Bautista, El Cerrito, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 15/079,024

(22) Filed: Mar. 23, 2016

(65) Prior Publication Data

US 2017/0279403 A1    Sep. 28, 2017

(51) Int. Cl.
*H02S 20/23* (2014.01)
*E04D 13/00* (2006.01)
*F24J 2/52* (2006.01)

(52) U.S. Cl.
CPC ............. *H02S 20/23* (2014.12); *E04D 13/00* (2013.01); *F24J 2/5245* (2013.01);
(Continued)

(58) Field of Classification Search
CPC .. H02S 20/10; H02S 20/23; F16J 15/14; F16J 15/02; F24J 2/5256; F24J 2/52;
(Continued)

(56) References Cited

U.S. PATENT DOCUMENTS 2,092,341 A    7/1937  De Vries
2,666,354 A    6/1950  Dim et al.
(Continued)

FOREIGN PATENT DOCUMENTS

AT        11215 U1 *  6/2010  ......... E04D 13/1476
CA     2 817 611 A1   12/2013
(Continued)

OTHER PUBLICATIONS

Machine translation of JP 5555364 B1 obtained from https://www4.j-platpat.inpit.go.jp/cgi-bin/tran_web_cgi_ejje?u=http://www4.j-platpat.inpit.go.jp/eng/translation/20161025033234823 8007232869510397BE30F77FAA1D13CCADB05A80FA58AC50 (last accessed on Oct. 24, 2016).*

(Continued)

*Primary Examiner* — Theodore V Adamos
(74) *Attorney, Agent, or Firm* — Kilpatrick Townsend & Stockton LLP

(57) ABSTRACT

Photovoltaic mounting systems that form chemical flashings are provided herein. Such mounting systems can include a mounting plate adapted to interface with an off-the-shelf mounting puck so as to allow mounting of the puck on the roof surface without use of traditional roof flashing and/or modification of shingles of the roof surface. Such mounting plates can include a top surface adapted to interface with the puck and a bottom surface that defines a cavity between the mounting plate and the puck in which to form the chemical flashing by injecting a flowable sealant into the cavity via an inlet of the mounting plate that remains accessible from outside the puck during mounting. Such mounting plates can further include features for orienting the plate, directing runoff away from any sealed roof penetrations and filling of the cavity with flowable sealant.

23 Claims, 15 Drawing Sheets

(52) U.S. Cl.
CPC ........ *F24J 2002/5294* (2013.01); *Y02B 10/20* (2013.01); *Y02E 10/47* (2013.01)

(58) Field of Classification Search
CPC ........ F24J 2/5243; F24J 2/5249; F24J 2/5252; F24J 2/465; F24J 2002/5294; F24J 2002/5296; F24J 2/5245; Y02E 10/47; Y02E 10/50; Y02B 10/20; E04D 13/00
USPC ..... 52/173.3, 698, 704; 248/237; 405/259.1, 405/259.3; 411/23, 386, 413, 82, 452, 411/257, 371.1; 136/243, 244
See application file for complete search history.

(56) References Cited

U.S. PATENT DOCUMENTS

| | | | |
|---|---|---|---|
| 3,504,498 | A | 4/1970 | Triplett |
| 3,940,941 | A | 3/1976 | Libert et al. |
| 4,119,083 | A * | 10/1978 | Heyen ................ F24J 2/28 126/674 |
| 4,372,708 | A | 2/1983 | Bower, Jr. et al. |
| 4,407,477 | A * | 10/1983 | Backlund ............ F16M 11/22 24/135 A |
| 4,472,088 | A | 9/1984 | Martin |
| 4,425,065 | A | 10/1984 | Sweeney |
| 4,531,861 | A | 7/1985 | Kash |
| 4,555,206 | A | 11/1985 | Sweeney |
| 4,619,094 | A * | 10/1986 | Yang ................ E04D 5/147 135/119 |
| 4,693,652 | A | 9/1987 | Sweeney |
| 4,830,558 | A | 5/1989 | Sweeney |
| 4,896,416 | A | 1/1990 | Cranko et al. |
| 5,281,065 | A | 1/1994 | Wu |
| 5,315,800 | A | 5/1994 | Weber et al. |
| 5,513,075 | A * | 4/1996 | Capper ................ H01R 4/2441 361/773 |
| 5,873,201 | A | 2/1999 | Fey |
| 5,937,603 | A | 8/1999 | Zeidler |
| 6,007,043 | A * | 12/1999 | Sperber ............... B64G 1/222 248/548 |
| 6,017,176 | A | 1/2000 | Marui |
| 6,035,595 | A | 3/2000 | Anderson |
| 6,536,729 | B1 | 3/2003 | Haddock |
| 7,963,726 | B2 | 6/2011 | Boot |
| 8,011,868 | B2 | 9/2011 | Stephan |
| 8,151,522 | B2 | 4/2012 | Stearns et al. |
| 8,549,792 | B2 | 10/2013 | Gens |
| 8,557,081 | B2 | 10/2013 | Sha et al. |
| 8,615,954 | B1 * | 12/2013 | Graboski ............. E04D 1/3402 52/443 |
| 8,733,718 | B2 | 5/2014 | Corsi |
| 8,756,871 | B1 | 6/2014 | Johnson |
| 8,756,881 | B2 | 6/2014 | West et al. |
| 8,875,453 | B2 | 11/2014 | Kanczuzewski et al. |
| 8,875,455 | B1 | 11/2014 | Yang |
| 8,931,989 | B2 * | 1/2015 | Stephan ............... F16B 43/001 411/371.1 |
| 2007/0272234 | A1 | 11/2007 | Allen et al. |
| 2008/0053008 | A1 * | 3/2008 | Ohkoshi ............. F24J 2/5205 52/173.1 |
| 2011/0067693 | A1 | 3/2011 | Paull |
| 2011/0126888 | A1 * | 6/2011 | Naitoh ................ H01L 31/048 136/251 |
| 2012/0144760 | A1 * | 6/2012 | Schaefer .................. E04C 3/06 52/58 |
| 2012/0186630 | A1 | 7/2012 | Jenkins et al. |
| 2012/0279560 | A1 * | 11/2012 | Sumida ................ H01L 31/042 136/251 |
| 2013/0020455 | A1 | 1/2013 | Sizelove et al. |
| 2013/0133270 | A1 * | 5/2013 | West .......................... E04B 1/38 52/58 |
| 2013/0167455 | A1 * | 7/2013 | Jenkins ..................... E04D 1/36 52/58 |
| 2013/0291479 | A1 * | 11/2013 | Schaefer ................ F24J 2/5245 52/745.21 |
| 2013/0299655 | A1 | 11/2013 | Sader |
| 2014/0000584 | A1 * | 1/2014 | Raucher ................ F16B 11/006 126/696 |
| 2014/0060625 | A1 | 3/2014 | Beuke et al. |
| 2014/0130847 | A1 | 5/2014 | West et al. |
| 2014/0130957 | A1 | 5/2014 | Verdier et al. |
| 2014/0175244 | A1 | 6/2014 | West et al. |
| 2014/0196769 | A1 | 7/2014 | Schoop et al. |
| 2014/0353435 | A1 | 12/2014 | Lui |
| 2015/0107185 | A1 | 4/2015 | Kose et al. |
| 2015/0204062 | A1 * | 7/2015 | Traxler .................... F24J 2/465 52/700 |
| 2015/0218824 | A1 | 8/2015 | Schaefer et al. |
| 2015/0280639 | A1 | 10/2015 | Atchley et al. |
| 2016/0142006 | A1 | 5/2016 | Meine et al. |

FOREIGN PATENT DOCUMENTS

| | | |
|---|---|---|
| CN | 202796998 U | 3/2013 |
| EP | 0276708 A1 | 8/1988 |
| EP | 2348263 A3 | 12/2014 |
| GB | 442832 A | 2/1936 |
| GB | 2 454 368 A | 5/2009 |
| JP | 2008274591 A | 11/2008 |
| JP | 2012 241410 A | 12/2012 |
| JP | 2014 088733 A | 5/2014 |
| JP | 5555364 B1 * | 7/2014 |
| JP | 2015 094093 A | 5/2015 |
| WO | 2008/156578 A1 | 12/2008 |

OTHER PUBLICATIONS

Machine translation of Foreign reference AT 11215U1, obtained from http://translationportal.epo.org/emtp/translate/?ACTION=description-retrieval&COUNTRY=AT&ENGINE=google&FORMAT=docdb&KIND=U1&LOCALE=en_EP&NUMBER=11215&OPS=ops.epo.org/3.2&SRCLANG=de&TRGLANG=en (last accessed on May 23, 2017).*
International Search Report dated Jun. 10, 2016, for International Patent Application No. PCT/US2016/019630, 7 pages.
Written Opinion dated Jun. 10, 2016, for International Patent Application No. PCT/US2016/019630, 6 pages.
"S-5! The Right Way" CorruBracket Brochure, Metal Roof Innovations, Ltd., Colorado Springs, CO, 2010, retrieved from the internet on Jan. 26, 2016 from: www.sunsourceproducts.com/catalog/productdetail.asp?cat=07&part=S5-COR , 2 pages.
International Search Report dated May 18, 2017 for corresponding International Patent Application No. PCT/US2017/019479, 7 pages.
Written Opinion dated May 18, 2017 for corresponding International Patent Application No. PCT/US2017/019479, 9 pages.

* cited by examiner

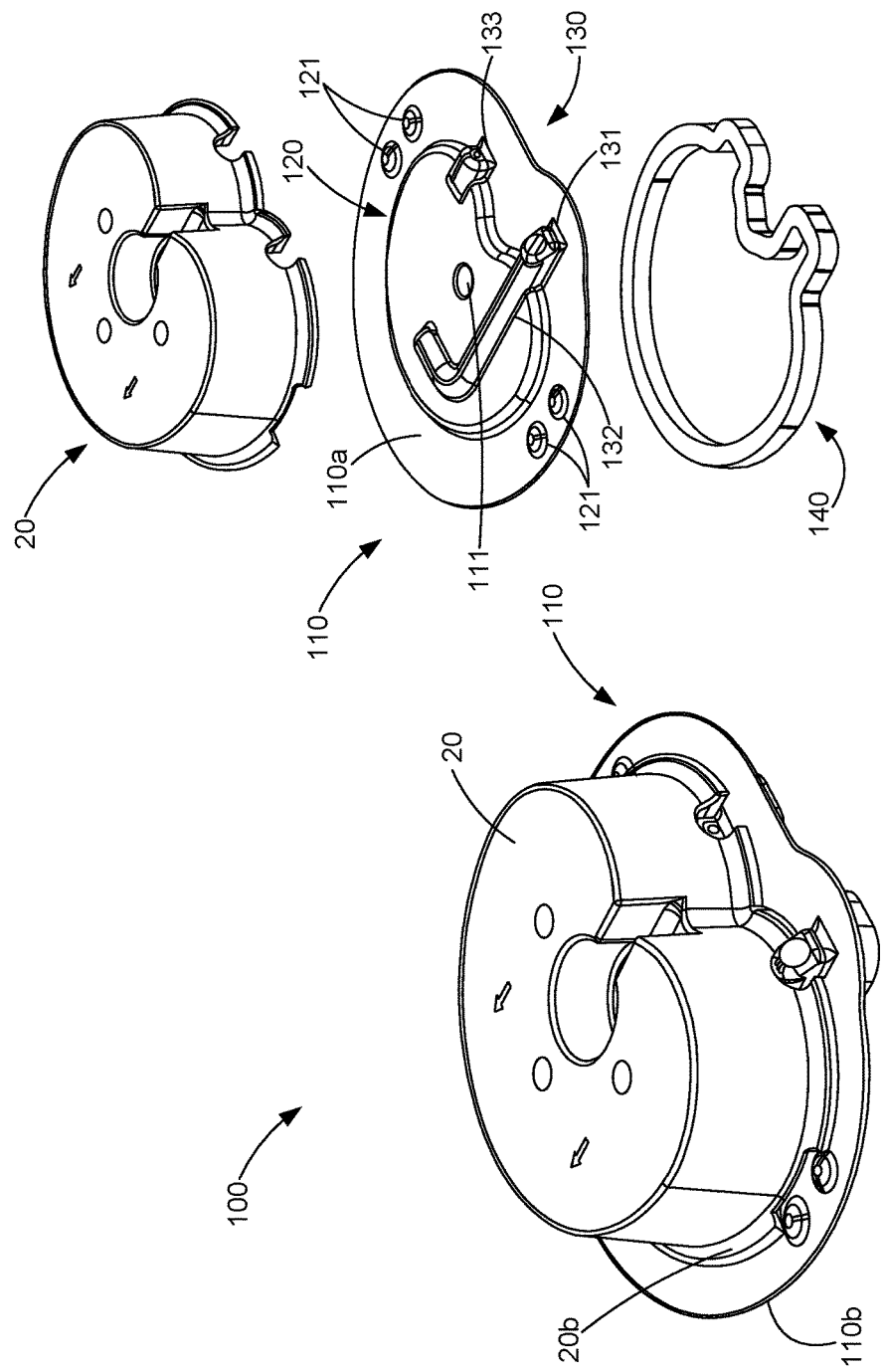

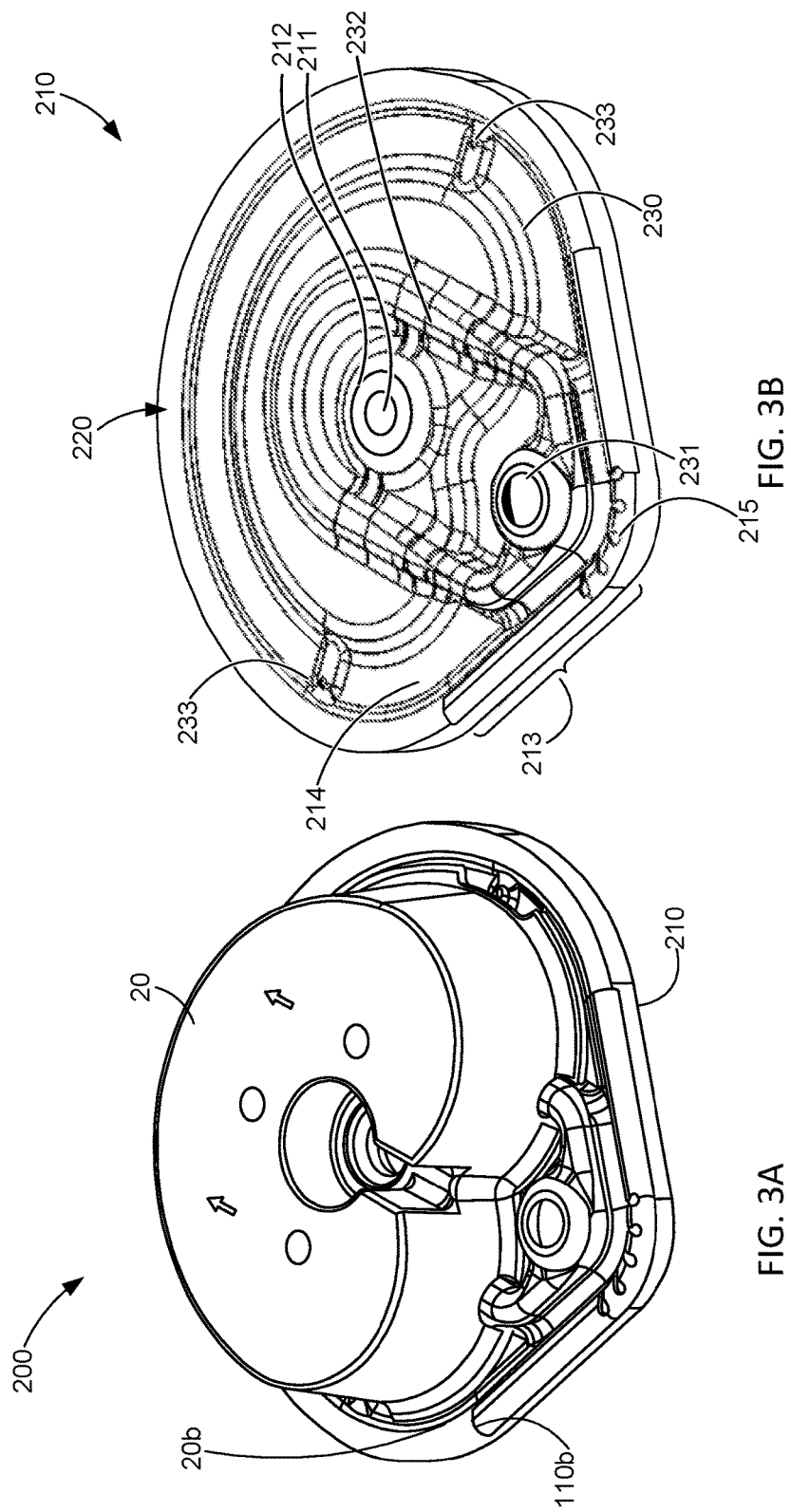

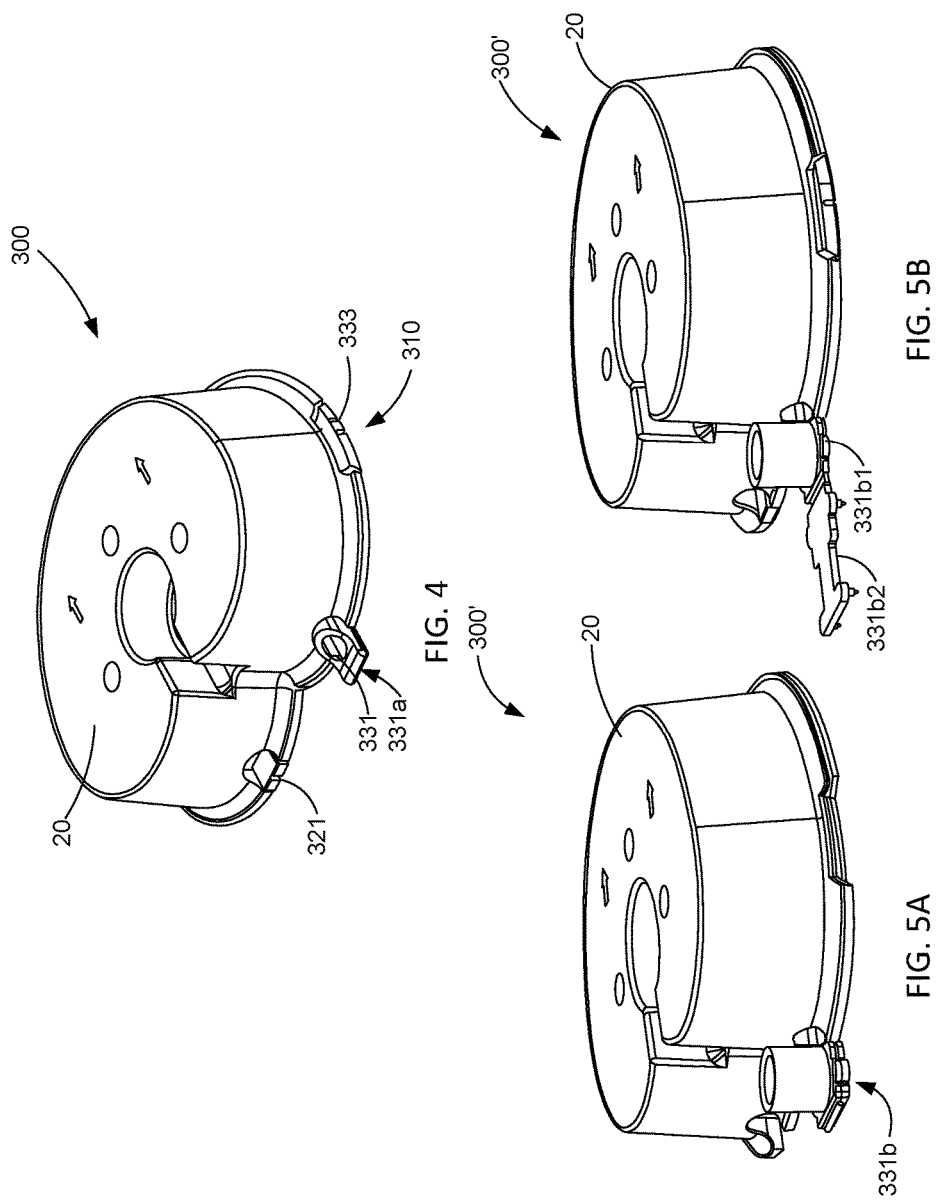

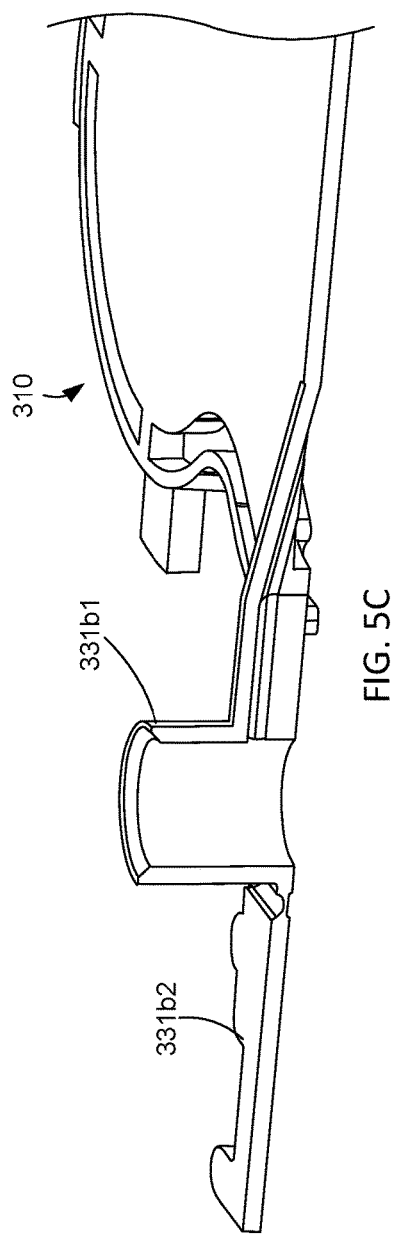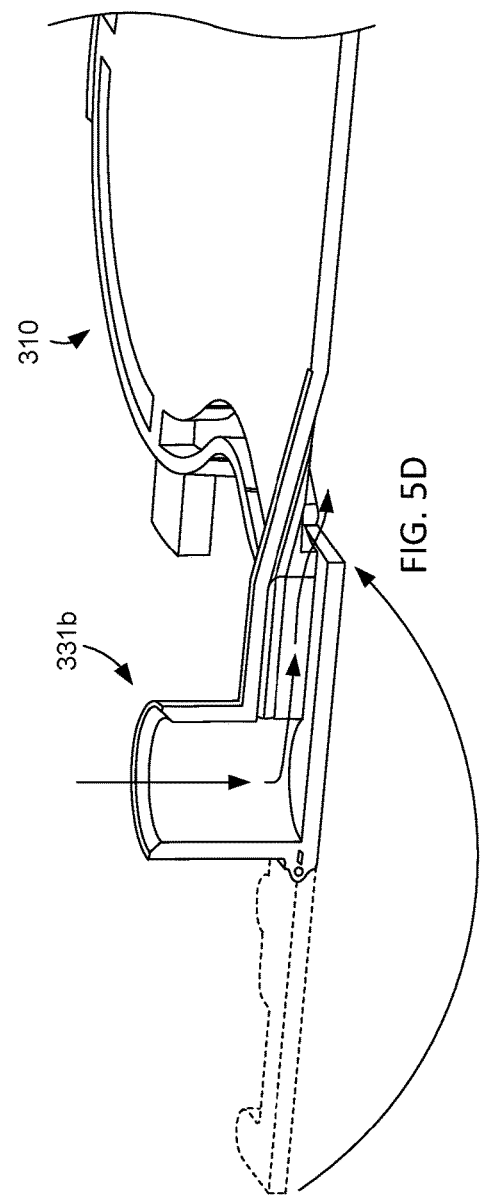

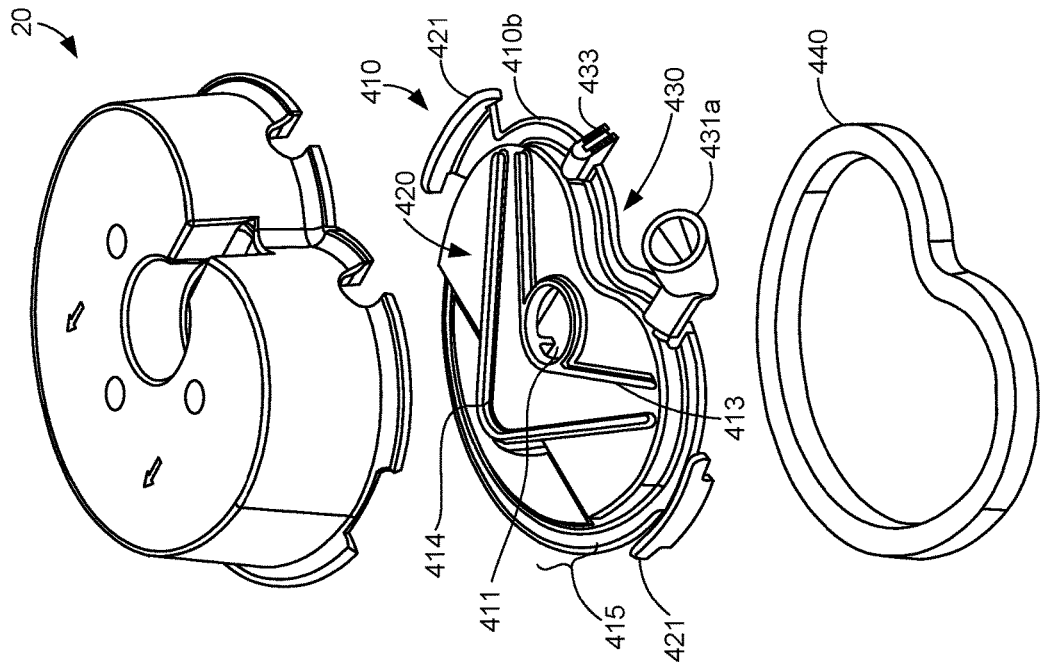
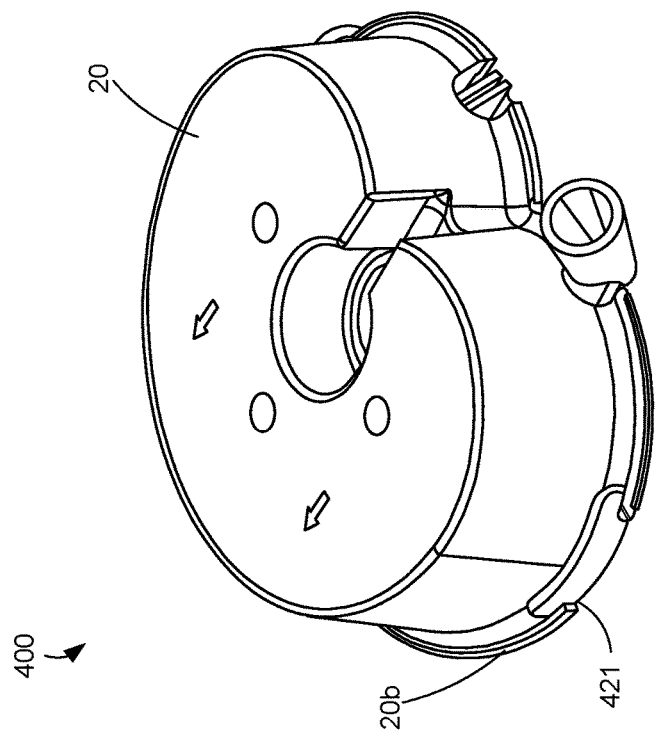
FIG. 6B
FIG. 6A

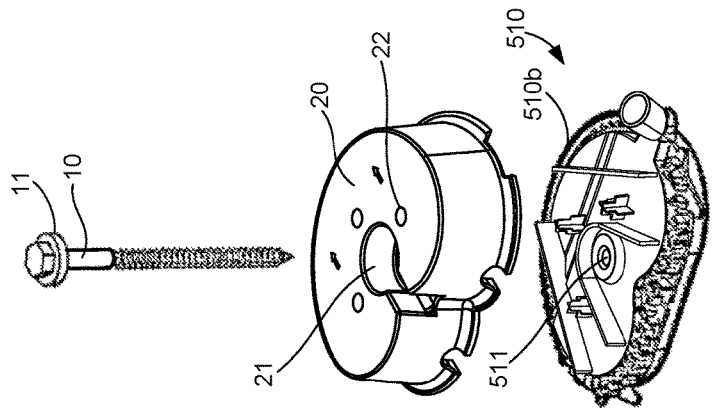
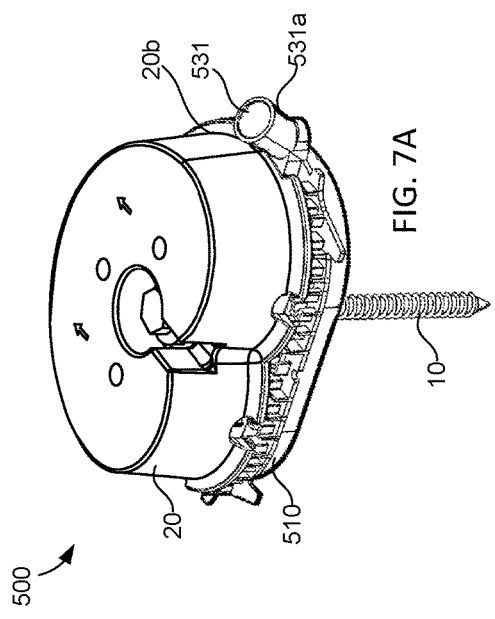
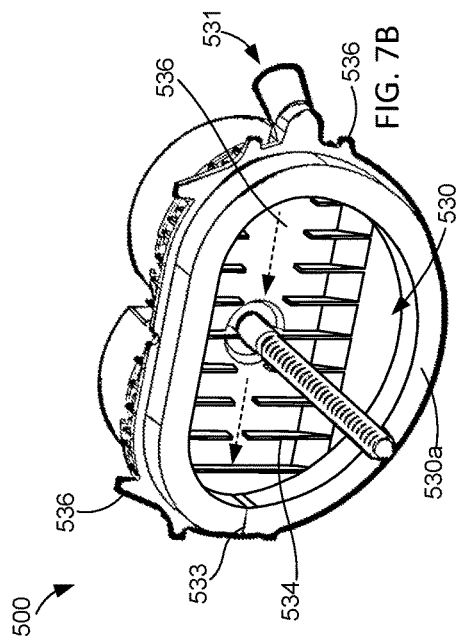

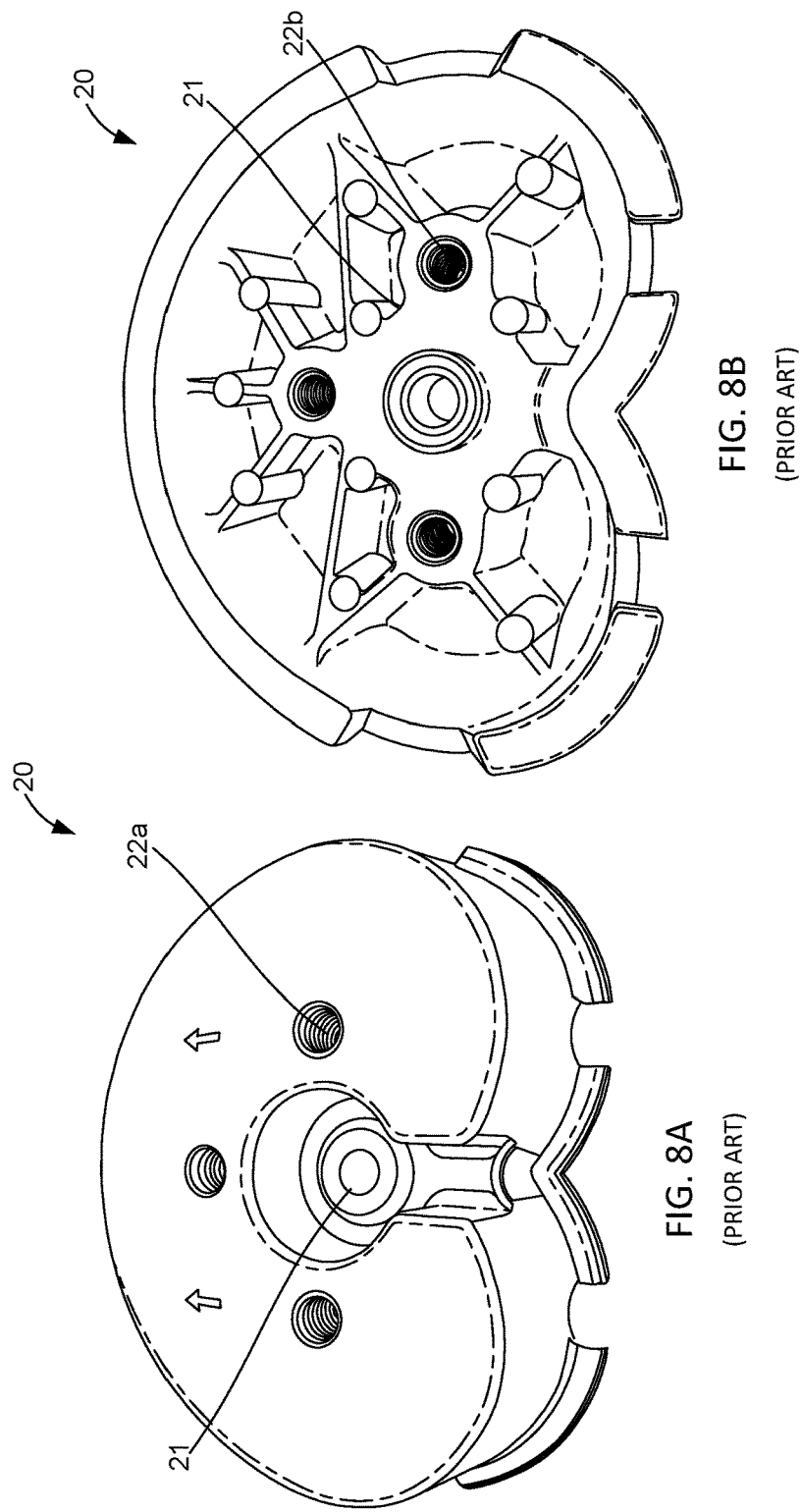

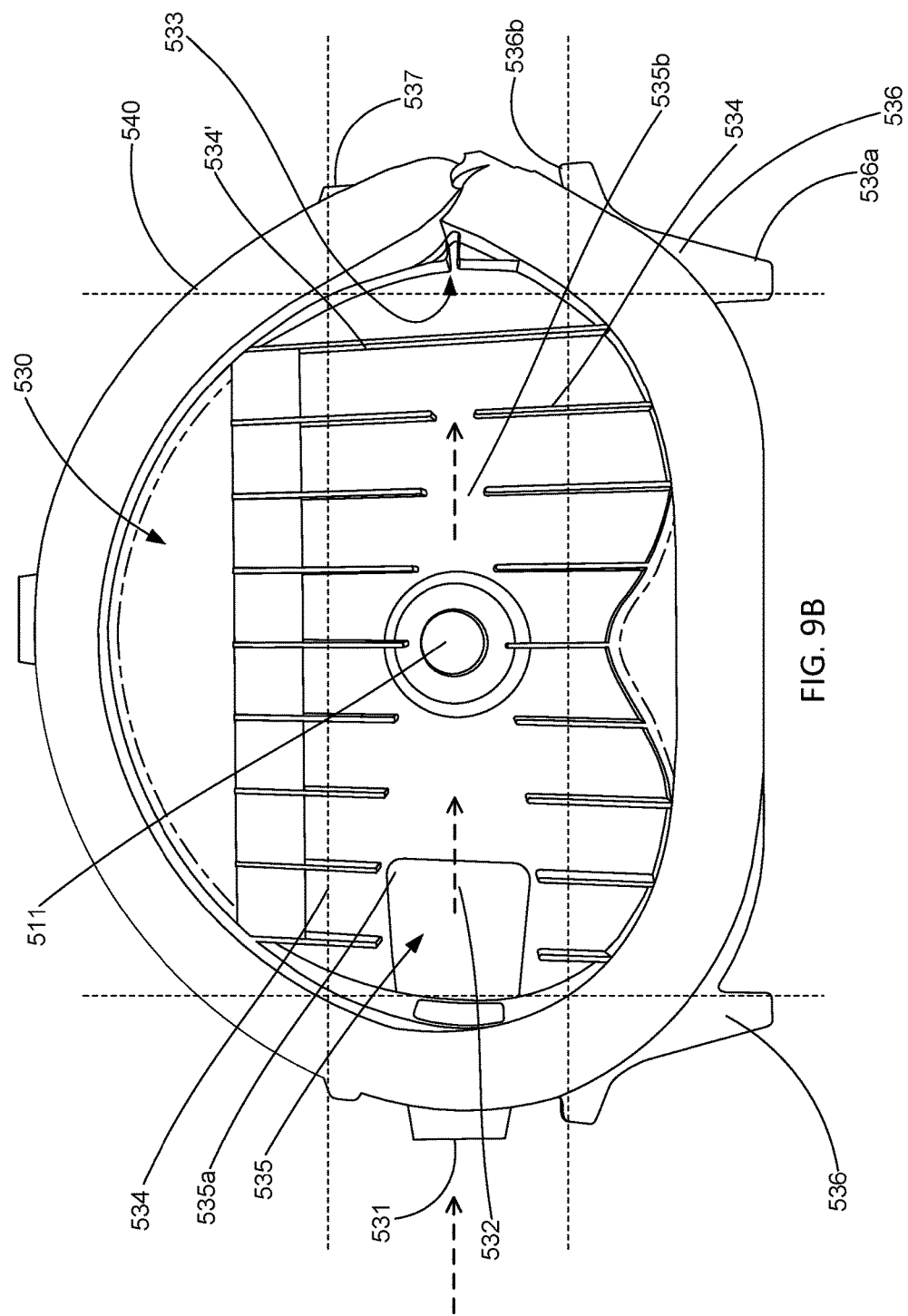

PHOTOVOLTAIC MOUNTING SYSTEM WITH SEALANT INJECTOR INLET

CROSS-REFERENCE TO RELATED APPLICATIONS

This is related to U.S. Provisional Patent Application No. 62/260,178 filed on Nov. 25, 2015 and U.S. Provisional Patent Application No. 62/120,841 filed on Feb. 25, 2015; Non-Provisional patent application No. 14/949,820 filed on Nov. 23, 2015 and Non-Provisional patent application Ser. No. 15/007,154 filed on Jan. 26, 2016; each of which is incorporated herein by reference in its entirety for all purposes.

FIELD OF THE INVENTION

The invention relates to photovoltaic energy generation mounting systems and more specifically to systems, devices and methods for installing photovoltaic (PV) modules on composition shingle roofs.

BACKGROUND

Although total market penetration of solar into the relevant base of potential customers remains relatively low in the United States (e.g. less than about one percent), residential and commercial solar installs have enjoyed double digit growth since the mid to late 2000s. Despite this recent success, developments to reduce cost, increase efficiency and improve overall home integration are ongoing and must continue to increase solar's market share when compared to fossil fuel-based grid power.

One problem that remains to be solved is an economic and effective solution to improve sealing of roof surface penetrations to prevent water from leaking into the roof structure while providing improved ease of installation. Whether photovoltaic modules are attached to rails, or proprietary rail-free mounting systems, the modules must be securely attached to the roof, which typically involves using a flashing combined with a lag bolt and seal. A pilot hole is typically drilled where the rafter is thought to lie, and if so, is followed by torqueing of a lag bolt into the pilot hole. Generally, the pilot hole is sized for the lag bolt being used, but optionally a larger hole can be drilled as needed. The flashing is then positioned so that the lag through-hole and seal are positioned over the pre-drilled hole. Typically, a puck or other structure is then placed on the flashing and a lag bolt is then passed through the puck, through the through-hole in the flashing and into the pre-drilled hole. The lag bolt is then torqued down to secure the puck to the roof so that the photovoltaic modules can then be mounted to the puck and flashing.

Although flashings cover up a lot of space, potentially covering mis-drilled or off-center pilot holes, flashings are relatively expensive because they require more metal than direct mounted solutions. Also, in order to set the flashing at the proper location, partially under the up-roof course of shingles, it is often necessary to remove existing nails holding down those shingles. Each time a nail is removed, another potential leak point is created. Installing flashing can also require removing or cutting away a portion of an up-roof shingle in order to interleave the flashing among the shingle and provide a flattened area in which to install the mounting puck.

Some installers have utilized direct mount or deck mounted solutions which abandon the flashing in favor of a flat bottomed mounting bracket or foot that is screwed or lagged directly into the roof deck. In cases where the lag is driven through a roof rafter, a single lag bolt may be used. In other cases, where the foot is simply screwed into the plywood that comprises the roof deck regardless of rafter location, three or more screws may be used to achieve the requisite strength. In either case, the holes made in the roof by the lag bolts must be sealed to prevent water from leaking in around the threads of the lag and/or to fill any nearby miss-drilled pilot holes.

To deal with this problem, installers have used caulk or other sealant, typically dispensed from a separate tube or caulk gun to fill these holes as the installation proceeds. This can be messy for the installer, requires a separate large and bulky tool (e.g., caulk gun), and requires another product SKU to be stocked in the truck's inventory. Further, there is no way to ensure that the installer remembers, or even if the installer does remember, that caulk or sealant is actually applied to the lag holes. Moreover, it can be difficult to apply caulk or sealant in the desired area since the mounting puck itself may obscure the area in which pilot holes and the lag bolt penetrates the roof. Therefore, there exists a need for photovoltaic mounting systems that provide reliable and controlled sealing of any penetrations of the roof while improving ease of installation and minimizing mess and installer mishaps. It would be further desirable to provide such improved mounting systems that can be used along with conventional, off-the-shelf components, and without having to rely on metal flashings.

SUMMARY OF THE INVENTION

The present invention relates to photovoltaic mounting systems, and in particular mounting systems adapted to form a chemical flashing about any roof penetrations associated with the mounting system. In various embodiments, the photovoltaic mounting system for mounting on a roof surface includes a mounting plate adapted for interfacing with a mounting puck to allow installation of the mounting puck on the roof surface without requiring use of traditional planar flashing and/or modification of the shingled roof surface. Advantageously, such mounting systems can include mounting plates adapted to retrofit conventional, off-the-shelf mounting pucks. Such mounting pucks further include a through-hole for insertion of a mechanical fastener, a bottom side facing towards the roof and a top side facing away from the roof when mounted that is adapted to couple with and support a mounting bracket supporting a photovoltaic module coupling device. The mounting plate is adapted to interface with the mounting puck and includes a through-hole for passage of the mechanical fastener and defines a cavity between the mounting plate and the roof surface in which the chemical flashing is formed. The mounting plate further includes a sealant injection inlet in fluid communication with the cavity and is accessible from outside the puck when interfaced with the mounting plate. While conventional mounting pucks are described throughout, it is appreciated that the mounting puck could be a mounting shell or other such structure provided in various sizes and shapes.

In various embodiments, mounting plate includes a contoured region that is sized and/or shaped to interface with a standard, off-the-shelf puck. The contoured region also defines an underside cavity between the mounting plate and the roof surface in which the chemical flashing is formed. In various embodiments, the contoured region further includes an open channel extending from the inlet towards and/or around the through-hole so as to facilitate flow of the flowable sealant around a roof surface penetration through which the mechanical fastener extends.

In various embodiments, the top surface of the mounting plate includes one or more interfacing and/or orienting features. These features can include one or more bumps or protrusions that interface with a notch or drainage-cut out on a bottom perimeter of the mounting puck. These features can also include a plurality of protrusions or posts that interface with an underside of a plurality of coupling orifices of the puck adapted for coupling to the support arm or leveling foot and are arranged so as to orient and/or couple the mounting plate to the puck. These posts can be inwardly tapered so as to interface with an interior threaded portion of the coupling orifices so as to orient and/or releasably couple the mounting plate to the mounting puck.

In various embodiments, the mounting system further includes a sealant gasket circumscribing a perimeter along a bottom roof facing side of the mounting plate so as to seal the interface between the mounting plate and the roof surface during injection of flowable sealant during mounting. The sealant gasket can be a foam ring contoured to correspond to a shape of the cavity and can be secured to the mounting plate with an adhesive or any suitable means. Such a sealant gasket can be included on any of the embodiments described herein.

In various embodiments, the inlet of the mounting plate is an inlet orifice of a size and shape suitable for insertion of a tip of a standard, off-the-shelf caulking or sealant gun. In various embodiments, the mounting plate further includes one or more outlets in fluid communication with the cavity between the mounting plate and the roof surface and configured such that an excess of flowable sealant flows out from the cavity through the outlet when the cavity is filled with the flowable sealant during mounting.

In various embodiments, a cross-sectional area of the one or more orifices of the outlet are less than a cross-sectional area of the inlet orifice so as to partly inhibit flow from the cavity through the outlets, thereby facilitating filling of the cavity.

In various embodiments, the inlet orifice includes a sealant injection nozzle protruding away from the roof surface to facilitate insertion of the tip of the caulking or sealant gun. The nozzle can be angled or extend perpendicular to the roof surface. The nozzle can integrally formed with the mounting plate that remains with the mounted system or can be subsequently detached after installation. The nozzle can also be a separate component that can be attached or interchanged with differing types of nozzles. In various embodiments, the mounting plate, inlet orifice and outlet is integrally formed of a single sheet of metal, such as stamped sheet metal, while in other embodiment, the mounting plate is formed of a continuous piece of hardenable polymer, such as in an injection molding process.

In various embodiments, the photovoltaic mounting system includes a mounting shell and a mounting plate adapted to interface with the mounting shell. The mounting plate can be adapted to retrofit a conventional, off-the-shelf mounting shell to allow mounting of the shell on the roof surface without traditional planar flashing and/or modification of the shingled roof surface. The mounting shell is adapted to couple with and support a mounting bracket supporting a photovoltaic module coupling device and includes a through-hole for insertion of a mechanical fastener.

In various embodiments, the mounting shell is formed of a rigid material of suitable strength for withstanding loads associated with supporting photovoltaic modules, typically a metal alloy. Mounting shells can be formed in various sizes and shape as needed for a particular application, including a cylindrical shape, an oval shape, a bean shape, a rectangular shape, irregular shapes, or any shape desired. The mounting plate is adapted to interface with the mounting shell and includes a through-hole for passage of the mechanical fastener. The mounting plate further includes a contoured region that defines a cavity between roof surface and the mounting plate that surrounds the through-hole in which the mechanical fastener extends when mounted on the roof surface. The mounting plate can include a sealant injection inlet in fluid communication with the cavity that is accessible from outside the shell when interfaced with the mounting plate to facilitate flow of sealant into the cavity during mounting.

In various embodiments, the mounting plate further includes an outlet in fluid communication with the cavity and arranged to allow passage of flowable sealant therethrough when the cavity is substantially filled. The mounting plate can include one or more additional features to facilitate controlled filling of the cavity with a flowable sealant injected through the inlet. These features can include any of a shaped open channel to direct sealant flow, a network or series of channel, such as fan-shaped channels or a maze of channels, and one or more ribs protruding into the cavity. In various embodiments, the mounting plate includes a series of ribs extending in a direction transverse to an axis extending between the inlet and the outlet so as to inhibit flow of sealant towards the outlet to facilitate filling of the cavity. The series of ribs include gapped regions around the through-hole of the mounting plate so as to facilitate sealing about any mechanical fastener extending through the through-hole of the mounting plate.

In any of the embodiments described herein, the mounting plate can be sized and dimensioned to extend near a bottom perimeter of the mounting shell, for example, within about 5 inches or less of the bottom perimeter. In some embodiments, the mounting plate extends just outside of the bottom perimeter to distribute loading forces applied through the metal puck or shell. In other embodiments, the mounting plate is about flush with the outer perimeter of the mounting shell. In still other embodiments, the mounting plate extends just inside of the bottom perimeter such that a load is applied predominately through a sidewall of the metal puck or shell. In some embodiments, the mounting plate includes an extended portion, a reinforced portion and/or a raised portion along a bottom down-roof side so as to withstand the increased load in the down-roof portion of the mounting puck or shell and maintain proper positioning of the mounting puck or shell.

In various embodiments, the mounting plate includes a top surface that is shaped to interface with the puck and includes an engagement surface that contacts the puck when interfaced. The engagement surface is sloped such that, when mounted on the roof surface, a down-roof side of the puck is supported further from the roof surface than an up-roof side of the puck. In some embodiments, a down-roof portion of the engagement surface is defined by a plurality of meandering walls so to raise the lower portion further from the roof surface and/or to reinforce the down-roof portion of the mounting plate against loading forces applied by the puck when supporting a photovoltaic module. This configuration allows for a mounting plate having consistent wall thickness such that the mounting plate can be formed in an injection molded process.

In various embodiments, the photovoltaic mounting system includes a mounting puck and a mounting plate that interfaces with the mounting puck to allow mounting of the puck without traditional planar flashing. The mounting puck is adapted to couple with and support a mounting bracket supporting a photovoltaic module coupling device and includes a through-hole for insertion of a lag bolt, a bottom side facing towards the roof and a top side facing away from the roof when mounted on the roof. The mounting plate is adapted to interface with the mounting puck, includes a corresponding through-hole, and defines a cavity between the mounting plate and the roof surface in which the chemical flashing is formed. The mounting plate includes an inlet to the cavity that is accessible from outside the puck when interfaced with the mounting plate so that a flowable sealant is injectable into the cavity. The mounting system can further include a gasket attached to a roof-facing side of the mounting plate to seal the cavity between the mounting plate and the roof surface when mounted.

In various embodiments, the mounting plate further includes one or more outlet in fluid communication with the cavity that extend outside the puck when interface so as to allow any excess sealant to extrude through the one or more outlets. Although it is appreciated that in any of the embodiments, the outlets could be configured to exit into another chamber within the puck. The inlet can be defined in portion of the mounting plate that interfaces with a first recess along a bottom perimeter of the puck and the outlet defined in a second portion of the mounting that interfaces with a second recess along a bottom perimeter of the puck. The first and second recesses may include any of a drainage cut-out along the most down-roof bottom edge of the mounting puck or the lateral notches on each side of the mounting puck. In various embodiments, the one or more outlets are located at a location that is lateral or up-roof from the location of the inlet so as to facilitate filling of the cavity with the flowable sealant and avoid flow of sealant through the outlets by gravity.

In various embodiments, the mounting plate includes one or more pairs of visual alignment indicators outwardly visible when the mounting puck is interfaced with the mounting plate. The one or more pairs can include a pair of features that indicate an outer bounds of the cavity in which the chemical flashing is formed to facilitate placement of the mounting system over any roof penetrations to facilitate sealing of the respective roof penetrations. The pair of features could also indicate an upper or lower boundary of the cavity so that a user can adjust the location of the mounting system to ensure the area in which the chemical flashing is formed is away from a drip edge. These features can include markings, lateral protrusion (e.g. horns, tabs), or any means suitable to indicate a boundary or alignment of the cavity in which the chemical flashing is forms. The alignment features can also include lateral indicators that correspond to an up-roof boundary of the chemical flashing to ensure that the pilot holes or lag bolt penetrations are formed away from a drip edge of an up-roof shingle course.

BRIEF DESCRIPTION OF THE DRAWINGS

FIGS. 2A and 2B illustrate an assembled view and an exploded view, respectively, of a mounting system in accordance with various embodiments.

FIGS. 3A and 3B illustrate an assembled view and an exploded view, respectively, of a mounting system in accordance with various embodiments.

FIG. 4 illustrates an assembled view of a mounting system having a sealant injection nozzle in accordance with various embodiments.

FIGS. 5A-5B illustrate views of a mounting system having an injection nozzle assembled by a user in accordance with various embodiments.

FIGS. 5C-5D illustrate detailed views of the sealant injection nozzle of the mounting system in FIG. 5A before and after assembly by the user.

FIGS. 6A and 6B illustrate an assembled view and an exploded view, respectively, of a mounting system in accordance with various embodiments.

FIGS. 7A, 7B and 7C illustrate top and bottom assembled views and an exploded view, respectively, of a mounting system in accordance with various embodiments.

FIGS. 8A and 8B illustrate top and bottom views of a conventional mounting puck compatible for use with mounting system in accordance with various embodiments.

FIGS. 9A and 9B illustrate top and bottom views perspective view of a mounting plate in accordance with various embodiments.

DETAILED DESCRIPTION

The following description is intended to convey a thorough understanding of the embodiments described by providing a number of specific embodiments and details involving PV mounting hardware for shingled roofs. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1A:
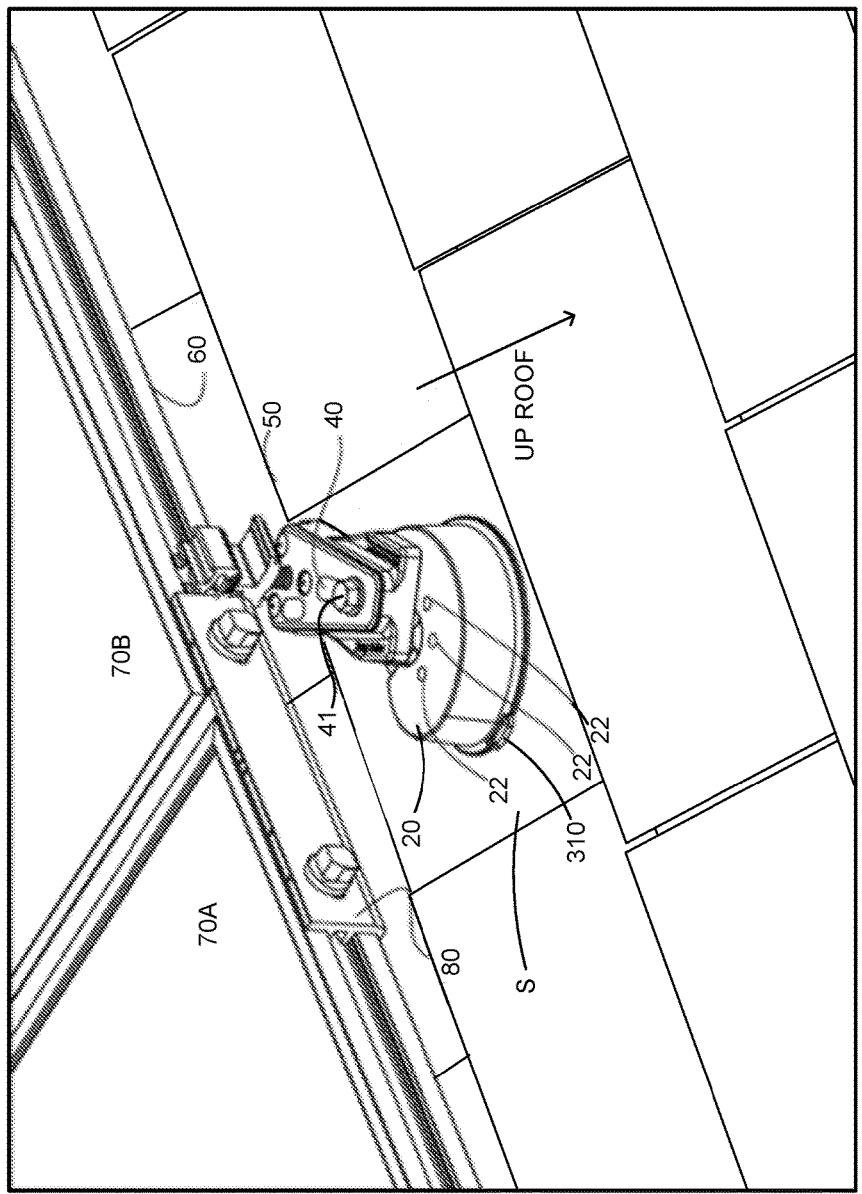
FIG. 1A illustrates a mounting system installed without traditional planar flashing or modification of the shingled roof surface in accordance with various embodiments.

Referring now to FIG. 1A, mounting system 100 includes a mounting plate 310 that conforms closely to the size and shape of mounting puck 20 to allow mounting of a conventional off-the-shelf mounting puck without modifying shingles S of the roof surface and/or without using traditional metal flashing. Leveling support arm 40 is secured to one of a series of coupling orifice 22 in the top of mounting puck 20 by bolt 41 and attached to a PV module coupling device 50, which fits into a proprietary groove of a side-rail 60 of PV modules 70A, 70B. Rail plate 80 can be attached to constrain movement of PV module coupling device 50 and/or couple adjacent rails 60 as needed for a particular installation.

Figure 1B:
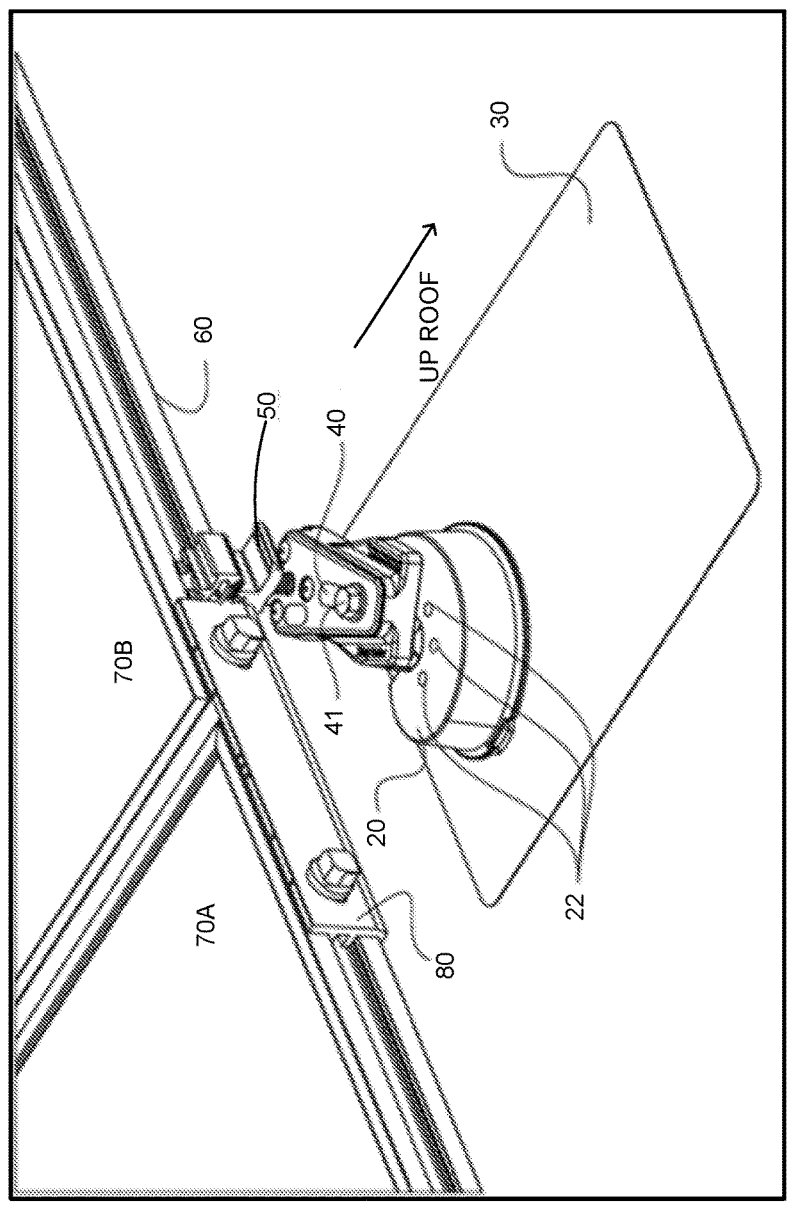
FIG. 1B illustrates a conventional mounting system installed with traditional planar flashing.
Figure 1D:
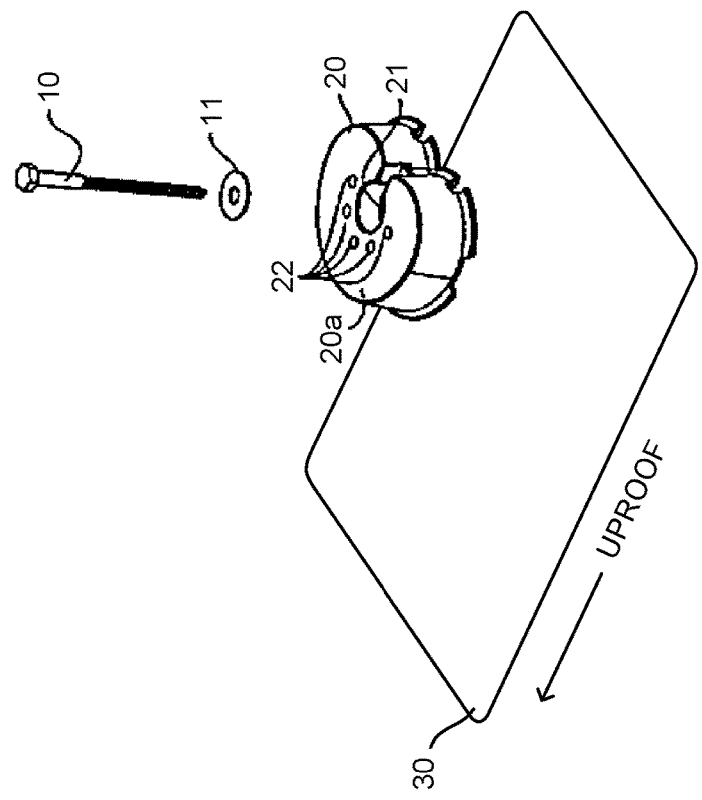
FIG. 1C illustrates a conventional mounting puck and FIG. 1D illustrates an exploded view of the puck being installed on a traditional planar flashing.
Figure 1C:
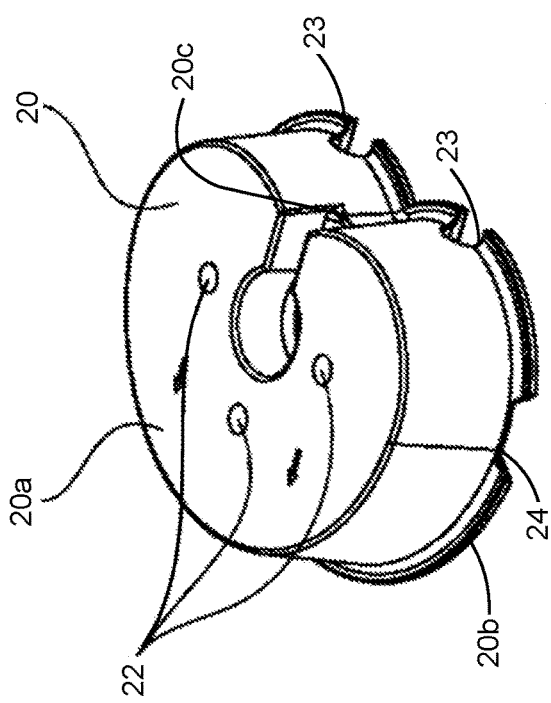
Figure 1E:
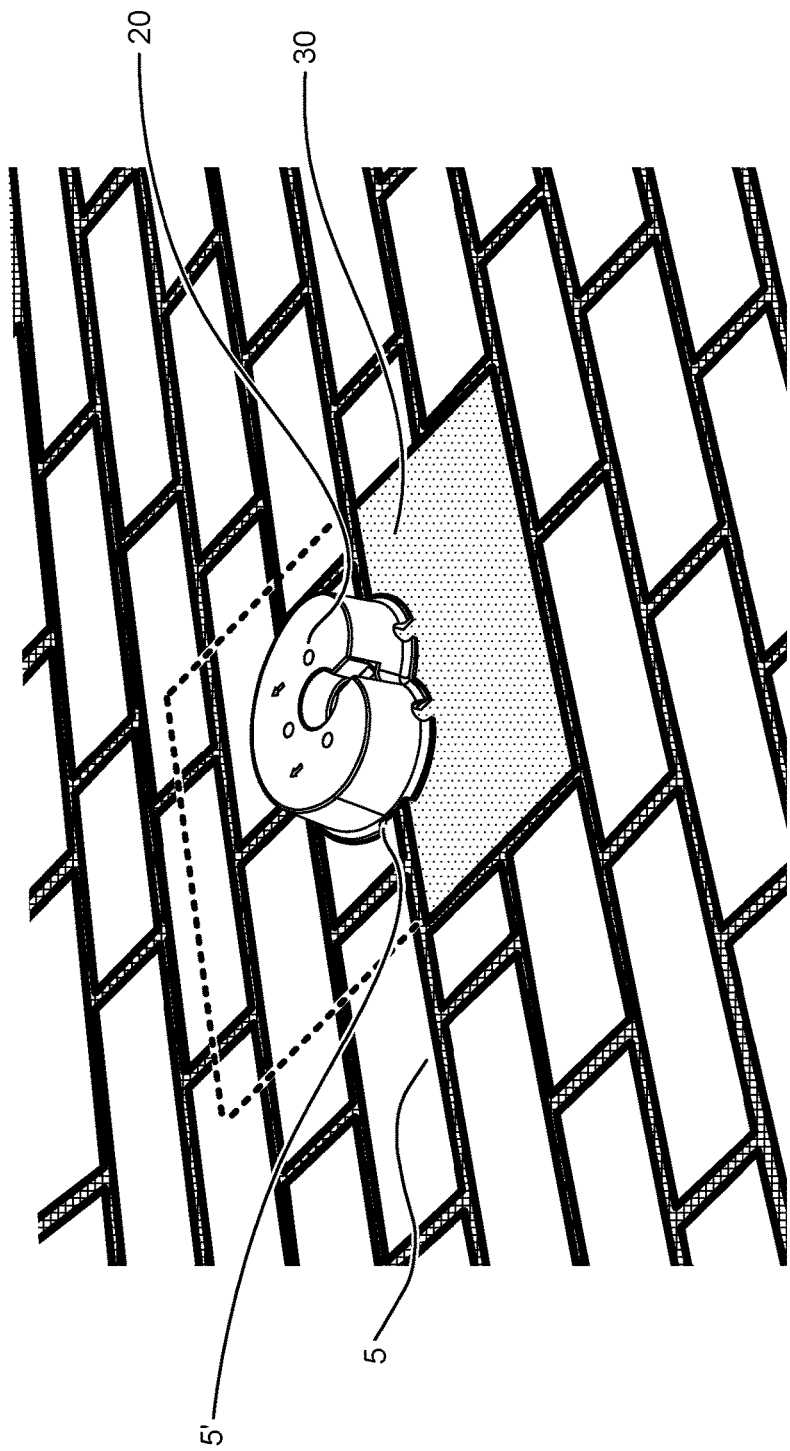
FIG. 1E illustrates a conventional mounting puck installed using traditional planar flashing and modification of the shingled roof surface.

As can be seen in FIGS. 1B-1E, traditional methods of installing a conventional mounting puck, such as that shown in FIG. 1C, includes positioning puck 20 over a rectangular metal flashing and interleaving the flashing between up-roof shingles, as shown in FIG. 1E. As shown in FIG. 1B, mounting puck 20 is installed over traditional rectangular flashing 30. The other components, including leveling arm 40, PV module coupling device 50 and PV modules 70A, 70B are attached in the same manner as described in FIG. 1A.

According to conventional methods of mounting, a metal flashing is inserted or interleaved between an upstream course of shingles and extends over a down-roof course of shingles in order to completely cover the exposed shingle area over which the mounting puck is mounted. To ensure roof runoff is directed away from any roof penetrations and mounting puck, the metal flashing extends a substantial distance further than the exposed shingle area on which the puck is mounted and sometimes include a boot or raised portion (e.g. vent pipe flashing) to deflect runoff. Such traditional flashing is generally a planar rectangular shape to allow the flashing to be interleaved between shingles such that a substantial portion of the flashing is disposed underneath an up-roof course of shingles, as shown by the dashed lines in FIG. 1E.

Installing traditional planar flashings presents certain challenges. Since traditional methods often require removing or lifting the up-roof course of shingles, this often necessitates removal of roofing nails to loosen or remove certain up-roof shingles, which may leave additional roof penetrations exposed. Therefore, such traditional flashing are often relatively large to cover any such penetrations. Also, a top portion of the flashing is typically secured to the roof, often with nails, which creates additional roof penetrations and requires additional roofing materials. Further, when the up-roof course of shingles is replaced over the shingles, often the shingles may interfere with what is being mounted such that the upstream shingles may need to be cut or trimmed to account for placement of the mount.

This traditional approach leads to waste of material and can account for considerable time and effort by the installer, particularly when a large number of items are being mounted, as is often the case when installing a series of mounting devices for supporting photovoltaic modules. For these reasons, it would be desirable to reduce waste in material as well as the time and effort of installation by providing mounting systems that can be secured to the roof without requiring use of traditional metal flashing and/or modification of the shingled roof surface. It would be further desirable if such systems can be compatible for use with conventional mounting pucks such that existing mounting pucks can be retrofit in order to be mounted without flashing, thereby avoiding the associated drawbacks noted above.

A conventional mounting puck, such as mounting puck 20 shown in FIG. 1C, is typically defined as a shell or housing having a top surface 20a adapted for mounting a support arm or leveling arm adapted for coupling with a PV module coupling device and a bottom roof facing surface with an outer perimeter 20b adapted for placement on a planar surface. Mounting puck housing is typically defined in a generally circular or oval shape that includes a recessed portion 20c in a down-roof side that extends inwardly toward the through-hole. This shape resembles a symmetrical kidney or bean shape, as can be seen in FIG. 1C, in which a majority of the sidewalls are convex with a small concave section 20c within the recessed portion along the down-roof side. Conventional puck 20 includes through-hole 21 for insertion of a mechanical fastener, such as lag bolt, and includes a recess that includes a down-roof passage to allow drainage of runoff from around the lag bolt head. Top surface 20a includes a plurality of coupling orifices 22 in varying positions adapted for coupling with a support or leveling arm in differing positions as needed for a particular install.

The top mounting surface is circumscribed by sidewalls that extend down to bottom perimeter 20b of the bottom side that includes a lip for engaging against the planar surface on which mounting puck 20 is mounted. Mounting puck 20 is typically formed of a metal alloy, such as aluminum or steel, but it is appreciated that mounting puck 20 can be formed of any material of suitable strength to withstand the loads associated with supporting a photovoltaic module.

As can be seen in FIG. 1D, in accordance with traditional installation methods, mounting puck 20 is positioned over the rectangular planar flashing 30. Such planar flashings can include a through-hole 31 for passage of lag bolt 10 inserted through mounting puck 20. While some flashings can include a through-hole or various orientation features, such flashings still rely on the rectangular planar shape of traditional flashings in the manner described above. The planar flashing 30 has previously been interleaved between shingles and attached to the roof surface, as shown in FIG. 1E, which shows in dashed line the extent to which the planar flashing 30 extends under the up-roof rows of shingles. Lag bolt 10 is then torqued into the roof surface, thereby securing mounting puck 20 to the roof over rectangular flashing 30. The up-roof shingle course is then replaced over the upper portion of rectangular flashing 30. Since a portion of the up-roof course of shingles overlays the area in which mounting puck 20 is mounted, a portion of the up-roof shingle is trimmed to accommodate mounting puck 20, this portion being shown as S' shown in FIG. 1E.

In accordance with various aspects of the invention, a mounting plate is provided that is adapted to interface with a mounting puck, including conventional mounting pucks, to allow installation without requiring use of traditional planar flashing and/or modification of the shingled roof surface. The mounting plate is adapted to facilitate formation of a chemical flashing that replaces traditional planar flashing and can be formed by the installer after mounting of the mounting puck to an existing exposed shingle surface. Such mounting plates define a cavity in which the chemical flashing is formed and include an inlet for injection of a flowable sealant to form the chemical flashing. In various embodiments, the mounting plate includes a single inlet and one or more outlets formed smaller than the inlet to facilitate filling of the cavity before any excess sealant is extruded through the outlets. The mounting plate can further include a sealant gasket for sealing the mounting plate against an uneven roof surface and retain injected flowable sealant within the defined cavity. In any of the embodiments herein, the mounting plate can be formed of any material suitable for withstanding loads and/or exposure to harsh weather conditions, for example, the mounting plate can be formed of a metal alloy (e.g. aluminum, steel), such as stamped sheet metal, or a hardenable polymer, such as in an injection-molded process. In various embodiments, the mounting plate can include various interfacing features for orienting and/or coupling the mounting puck to the mounting plate. Such mounting systems can be further understood by referring to the examples shown in detail in FIGS. 2A-9B described further below.

FIGS. 2A and 2B show an assembled view and an exploded view, respectively, of mounting system 200 that includes mounting puck 20 and mounting plate 110. As can be seen in the exploded view, mounting plate 110 includes a top surface 110a, a through-hole 111 for passage of a mechanical fastener, a contoured region 120 that defines underside cavity 130, alignment bumps 121, sealant injection inlet 131 and outlet 133. Top surface 110a faces away from the roof surface and is adapted for interfacing with mounting puck 20 and contoured portion 120 defines cavity 130 beneath mounting plate 110 in which the chemical flashing is formed. Inlet 131 is adapted to facilitate injection of a flowable sealant by the installer while mounting puck 20 is interfaced with mounting plate 110, as shown in FIG. 2A. In this embodiment, inlet 131 is shaped to allow insertion of a distal tip of an injection nozzle of a caulking or sealant gun. Such a configuration is advantageous as it allows the installer to use a preferred type of flowable sealant as needed for particular applications (e.g. arid climates versus northern climates where sub-freezing temperatures are common). While in this embodiment, inlet 131 is shown as being an orifice provided on an angled portion, it is appreciated that inlet 131 could be formed in various other shapes or alignments as needed, including use of additional nozzles, such as any of those described herein. In some embodiments, a separate nozzle attachment can be provided that fits standard nozzle or caulking guns to facilitate injection into an inlet of mounting plates, such as any of those described herein.

In various embodiments, mounting plate 110 includes contoured region 120 that is shaped to correspond to the general shape of the interior region on an underside of mounting puck 20. In this embodiment, the contoured region 120 is kidney-shaped to correspond to the interior region of mounting puck 20. Although this embodiment is shown as being used with a conventional mounting puck 20 of a kidney-shape, it is appreciated that this same concept could apply to mounting plates used with mounting pucks of various other shape, such as circular or rectangular mounting pucks. In such embodiments, mounting plates can include a contoured region shaped to correspond to the shape of the respective puck with which the mounting plate is used. While placement and orienting of mounting puck 20 is facilitated by the shape of contoured portion 120, mounting plate can further include one or more orientation features and/or coupling features, such as any of those described herein.

As can be seen in FIG. 2B, mounting plate further includes a sealant guide channel 132, which is an open underside channel defined in contoured portion 120 that facilitates flow of flowable sealant into cavity 130 towards through-hole 111. In various embodiments, cavity 130 is defined with a clearance suitable for formation of a chemical flashing (e.g. about 2 mm, 3 mm, 4 mm, or greater) as needed for a particular application. In this embodiment, guide channel 132 is L-shaped so as to direct the flow of sealant around the mechanical fastener before it passes through outlet 133. Such a configuration is useful in ensuring that the flowable sealant seals the mechanical fastener and any associated roof surface penetrations before any excess sealant is extruded through outlet 133. Outlet 133 exits outside mounting puck 20, which serves as an indicator to the installer than cavity 130 has been substantially filled. While guide channel 132 is L-shaped in this embodiment, it is appreciated that guide channel can be formed in various other shapes. In addition, the orifice of outlet 133 is smaller than that of inlet 131 to inhibit flow of sealant through the outlet until cavity 130 is filled and pressure begins to build within cavity 103.

Mounting plate 120 further includes a gasket 140 that seals the bottom perimeter of mounting plate 120 against any uneven roof surface. Typically, such a gasket is formed of foam, an elastomeric, or any other suitable material to allow the gasket to be compressed to seal the interface between mounting plate 110 and roof surface and prevent leakage about the perimeter. In various embodiments, gasket 140 is attached to the bottom, roof-facing side of mounting plate 120 with an adhesive or any suitable means. Gasket 140 can be die-cut, bent into shape or formed by various means.

In various embodiments, mounting plate is defined so that a majority of the outer perimeter is within a few inches of the bottom perimeter of mounting puck 20 (e.g. less than 5 inches, less than 3 inches, less than 1 inch, adjacent and flush). Since the outline of the mounting plate fits within the outline of an exposed shingle surface, this avoids the need to lift or remove any up-roof shingles and/or modify or trim any existing shingles. In the embodiment of FIG. 2A, mounting plate 110 is defined so that an outer perimeter 110$b$ is just outside the outer bottom perimeter 20$b$ of mounting puck 20, as compared to traditional rectangular planar flashing. In this embodiment, since the footprint of mounting plate 110 is slightly larger than that of mounting puck 20, mounting plate 110 distributes the load through mounting puck 20 over a larger surface area, which prevents the bottom edge of mounting puck 20 from depressing or cutting into the shingled roof surface.

FIGS. 3A and 3B shows a view of assembled mounting system 200 and a separate view of mounting plate 210, respectively, in accordance with various embodiments. Similar to mounting plate 110, mounting plate 210 is adapted for retrofit of conventional mounting puck 20 to allow mounting without use of a planar flashing and/or modification of the roof surface. Similar to the embodiment of FIG. 2A, mounting plate 120 is defined so that an outside perimeter 210$b$ is just outside bottom edge 20$b$ of mounting puck 20, well within the perimeter of an exposed roof shingle. Mounting plate 210 includes a through-hole 211 for passage of a mechanical fastener inserted through mounting puck 20, a contoured region 220 that defines cavity 230 beneath mounting plate 210, a sealant injection inlet 231, a guide channel 232, and a pair of outlets 233.

As can be seen in FIG. 3A, mounting plate 210 is shaped and contoured to interface with mounting puck 20 with sealant injection inlet 231 and outlets 233 positioned to be accessible from outside mounting puck 20 when interfaced with mounting plate 210. In this embodiment, sealant injection inlet is positioned along a center of a down-roof protruding portion 213 and is coupled with a pill-shaped guide channel 232 that extends about through-hole 211 within cavity 230. Such a configuration ensures improved sealant flow around the mechanical fastener extending through the assembly where it penetrates through the roof surface. In this embodiment, outlets 233 are provided on each side and positioned on protrusions that reside within the lateral notches 24 on each side of mounting puck 20. Such a configuration allows cavity 230, as well as the chemical flashing formed within, to remain predominately, if not entirely, within the outline of mounting puck 20. System 200 can further include a sealant gasket (not shown), such as described in various other embodiments herein.

In this embodiment, the down-roof side of mounting plate 210 includes an extended portion 213 such that the outline of mounting plate 210 resembles a teardrop. Extended portion 213 further extends outline 210$b$ of mounting plate 210 along the higher load bottom-side of mounting plate 210. This feature helps withstand downward bending forces due to the weight of the photovoltaic modules supported by mounting puck 20 and further distributes the load from mounting puck 20. To provide further reinforcement, the outer edge of mounting plate includes a curved lip. Typically, this embodiment is formed of stamped sheet metal in which the thickness of the material throughout the component is substantially the same such that this curved lip allows for additional reinforcement while still allowing mounting plate 210 to be formed in a stamped sheet metal process. It is appreciated, however, that mounting plate 210 could also be formed of various other materials, including injection molded plastic. This curved lip can be included along the outer edge or can be included only along the area where additional reinforcement is desired, such as along extended portion 213. Since the addition of this curved lip creates a recess portion above the down-roof edge in which rainwater can accumulate, a series of drainage holes 215 are provided to allow drainage of any accumulated water.

FIG. 4 shows mounting system 300, which includes mounting plate 310 interfaced within mounting puck 20. Unlike the embodiments in FIGS. 2A and 3A, mounting plate 310 is defined so that an outer perimeter of mounting plate 310 is just inside the bottom perimeter of mounting puck 20. Such a configuration is advantageous as it allows the load of any supported PV modules to go through the outer edge of mounting puck 20, rather than through mounting plate 310. Since mounting plate 310 is subjected to less stress, it can be constructed of a lighter or cheaper material, such as a less durable plastic, or can be formed with a wall thickness that is less than that of other embodiments where load is transferred through the mounting plate. Since an outer perimeter of mounting plate 310 is just inside, it is obscured in this view, but such mounting plates can include any of the cavity and channels or other features described herein.

In this embodiment, sealant injection inlet 331 is disposed on a down-roof side so as to interface within a down-roof drainage cut-out along the most down-roof portions of mounting puck 20. Sealant injection inlet 331 further includes injection nozzle 331a adapted to interface with a distal tip of a sealant or caulking gun. While injection nozzle 331a occupies one drainage cut-out 23 of mounting puck 20, mounting plate 310 can include an orienting feature 321 (e.g. protrusion or blank) that occupies the other drainage cut-out 23 of mounting puck 20. Typically nozzle 331a is formed integrally with mounting plate 310, although it is appreciated that nozzle 331a could be a separate component that can be inserted by an installer or could be interchangeable with various other types of nozzles as needed for a particular application or type of sealant. In various embodiments, injection nozzle 331 is scored so as to allow an installer to break off the nozzle after mounting is complete.

Mounting plate 310 further includes outlet 333 in fluid communication with an underside cavity (not shown) of mounting plate 310 and extends outside mounting puck 20 through a protrusion that resides within lateral notch 24. Such an outlet feature can be provided on one or both lateral sides of mounting plate 310.

In various embodiments, mounting plate includes one or more outlets in fluid communication with an underside cavity of the mounting plate that extend to an outside of mounting plate that are either lateral with or up-roof from an inlet. Typically, mounting plate includes a single inlet. Such a configuration inhibits flow of sealant through the outlets until the cavity is filled with sealant and pressure begins to build.

FIGS. 5A and 5B illustrate mounting system 300', similar to that of FIG. 4A, except the sealant injection nozzle 331b is defined to allow mounting plate 310' to be formed in an injection molding process without use of a slide, which is used in injection molding processes to create partly enclosed cavities. This feature reduces cost of production by avoiding use of a slide, but requires subsequent assembly as it creates a two-part nozzle 331b that is assembled before mounting. Assemblable nozzle 331b includes an outer cylindrical opening 331b1 and a lower tab 331b2 that is folded underneath to define a partly enclosed passageway extending through nozzle 331b. FIG. 5A shows nozzle 331b' fully assembled, while FIG. 5B shows nozzle 331b' before assembly by the user, with the lower tab 331b extending outward. Detail views of assemblable nozzle 331b are shown in FIGS. 5C-5D. Typically, mounting plate 331b1 would be provided to an installer in the configuration shown in FIG. 5B, with the lower tab 331b2 extending outward, as shown in FIG. 5C. The installer would then fold lower tab 331b2 towards the underside of mounting plate 310, as shown in FIG. 5D, thereby forming a fluid flow conduit (see arrows) for flow of sealant into the underside cavity defined by mounting plate 310. In various embodiments, additional features, such as corresponding coupling features (e.g. pegs and holes) can be included on lower tab and the upper nozzle portion so as to secure lower tab in the assembled configuration.

FIGS. 6A and 6B show an assembled and an exploded view respectively of mounting system 400, which includes mounting plate 410 adapted for interfacing with mounting puck 20. In this embodiment, mounting plate 410 is designed so that an outer perimeter 410b extends just inside with bottom perimeter 20b of mounting puck 20 with only sealant injection inlet 431, outlet 433 and a pair of resilient retention wings 421 extending outside mounting puck 20. As described in the previous embodiment, this configuration allows the load from supporting the PV modules to be applied to the roof through the sidewalls of mounting puck 20. Although in some embodiments, the perimeters could be flushed such that the load passes through mounting plate 410 as well. In this embodiment, retention wings 421 extend from opposing lateral sides of mounting plate 410 and extend upwards away from the roof surface, as can be seen in FIG. 6B. Retention wings 421 are resiliently deflectable and are shaped so as to be received within lateral notches 24 on opposite sides of mounting puck 20, as shown in FIG. 6A. When received within the lateral notches 24, retention wings 421 retain mounting plate 410 interfaced with mounting puck 20.

As can be seen in FIG. 6B, the sealant injection inlet 431 and outlet 433 are positioned on the bottom, down-roof side of mounting plate 410 so as to be received within the pair of drainage cut-outs 23 along the most down-roof portions of bottom perimeter 20b of mounting puck 20. In this embodiment, injection inlet 431 includes sealant injection nozzle 431a angled upwards to facilitate insertion of a distal tip of a caulking or sealant gun. Mounting plate 410 includes a contoured region 420 that defines an underside cavity 430. In this embodiment, contoured region 420 includes a reduced cavity area 415 in an up-roof region, which reduces the chemical sealant volume in the up-roof region since any penetrations being sealed would generally be lateral to the roof penetration through which the mechanical fastener extends. For example, any unused pilot holes would be made along a lateral axis to the left or right of the roof penetration created for the mechanical fastener. System 400 can further includes sealant gasket 440, as described in previous embodiments.

As can be seen in FIG. 6B, top surface 410a further includes chevron shaped ridges 413, 415 opening toward a down-roof direction so as to direct any runoff around through-hole 411 and to the sides of mounting plate for eventual runoff to the roof surface. In this embodiment, a central portion of ridge 413 extends around through-hole to further inhibit any flow of runoff into through-hole 411. One or both of these shaped ridges can be included in any of the embodiments described herein.

FIGS. 7A-7C depict mounting system 500, which includes mounting plate 510 adapted for interfacing with mounting puck 20 to be mounted on a roof surface by a mechanical fastener, such as lag bolt 10, in accordance with various embodiments. When mounting plate 510 is interfaced with mounting puck 20, lag bolt 10 is inserted through the assembly, as shown in FIG. 7A. As lag bolt 10 is torqued into the roof surface, an associated bolt head or washer 11 engages a top surface of mounting puck 20 to secure the assembly to the roof. In this embodiment, outer perimeter 510b extends just outside bottom perimeter 20b of mounting puck 20 such that the load is transferred through mounting plate 510 against the roof surface. Mounting plate includes underside cavity 530 that extends around the lag bolt, as shown in the underside view of FIG. 7B, and a sealant injection inlet 531 in fluid communication with cavity 530 that is accessible from outside mounting puck 20. Sealant injection inlet 531 further includes injection nozzle 531a that is angled and tapered to facilitate insertion of a distal tip of a standard caulking or sealant gun.

Mounting plate 510 further includes outlet 533 in fluid communication with cavity. Outlet 520 is defined as a slit within a laterally extending portion to allow excess sealant to flow outside from cavity 530 and outside mounting puck 520 to provide a visual indicator to the installer as to when cavity 530 is substantially filled. In this embodiment, inlet 531 is dimensioned and positioned to extend through lateral notch 24 in one side of mounting puck 20, while outlet 533 is dimensioned and positioned to extend through lateral notch 24 on an opposite side of mounting puck 20. It is appreciated, however, that in various other embodiments the inlet and outlets could be configured to extend from various other portions of the mounting puck 20, such as from the drainage cut-outs 23 on the down-roof side.

In one aspect, mounting plate can include various features to control flow of sealant into the cavity. For example, as can be seen in FIG. 7B, mounting plate 510 can include a series of ribs 534 that protrude into cavity 530 that control the flow of sealant through cavity 530. Ribs 435 extend transverse, typically cross-wise, to the flow of sealant, which in this embodiment extends along an axis extending between inlet 531 and outlet 533 (shown in dashed arrows). Ribs 534 can extend partly or entirely to the roof surface in order to control flow of sealant. In embodiments where some or all ribs extend to the roof surface, ribs further include gaps such that the ribs define a network of channels through which the sealant flows before being directed to outlet 533. In embodiments, where ribs extend only partly to the roof surface, the ribs still provide increased resistance to flow of sealant that facilitate filling of cavity 530 before sealant reaches outlet 533. In any such embodiment, ribs 534 can include a series of gaps that allow for improved flow in certain areas in order to create a desired flow path. Typically, this series of gaps is provided to facilitate flow around through-hole 511 to improve sealing about the roof penetration. As can be seen in the detailed underside view shown in FIG. 9B, the series of gaps 535 can gradually reduce in length along the flow path from a relatively large gap 535a to a relatively short gap 535b. In addition, gaps can be omitted from the most downstream rib 534' to further inhibit flow near outlet 533 to ensure cavity 530 is substantially filled around the fastener portion before any sealant flow out through outlet 533.

Figure 9A:
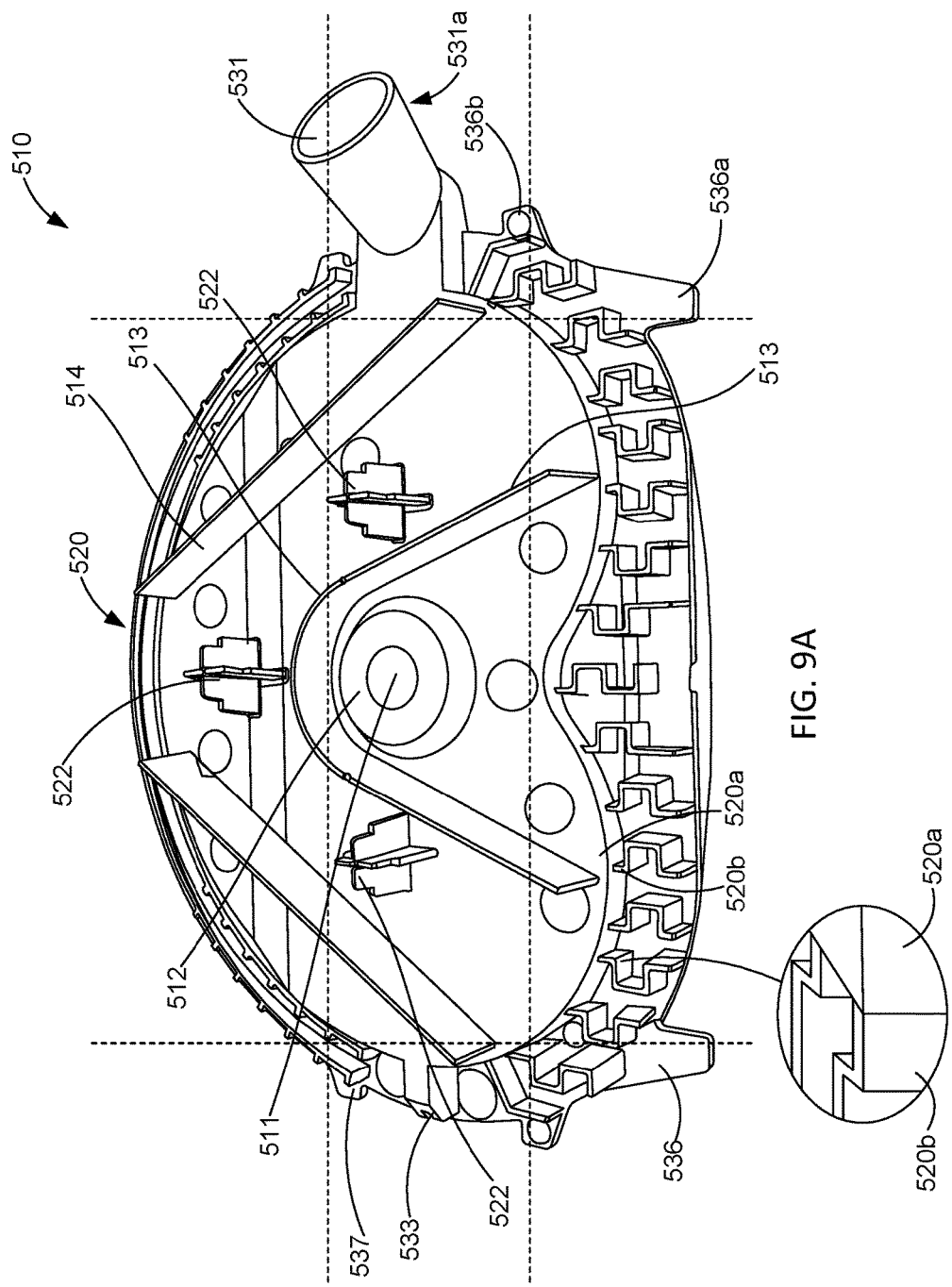

In another aspect, anchor base can include one or more alignment features to faciliate placement on the shingled roof surface or positioning over any penetrations in the roof surface to ensure the penetrations are properly sealed. For example, such alignment features can include a pair of lateral tabs or "horns" 536 that extend from each down-roof corner of mounting plate 510. Each horn 536 includes a down-roof extension 536a and a lateral extension 536b. The down-roof extension 536a corresponds to a boundary of an optimal sealing area within the up-roof/down-roof direction and lateral extension 536b corresponds to a down-roof boundary in a lateral direction, orthogonal to the up-roof/down-roof direction. The area of optimal sealing of the chemical flashing defined within cavity 530 can be further understood by referring to FIG. 9B. It is desirable for any roof surface penetrations to be located within this optimal sealing area inside the outer edges of the chemical flashing area to ensure the penetrations are properly sealed with sealant. Since the extensions of the alignment indicators are visible from the top of the assembly, as can be seen in FIGS. 7A and 9A, this allows the installer to determine if the roof penetrations fall within the opimum sealing area. If any roof penetrations fall outside of this area, the installer would need to manually seal those penetrations before mounting the system.

In various embodiments, additional alignment features can be used to faciliate locating of the mounting. For example, it is desirable if the chemical flashing is formed away from a drip edge of an up-roof course of shingles. Along these lines, mounting plate 510 includes alignment tabs 537 extending laterally from each side near an up-roof boundary of the optimal sealing area above through hole 511. Positioning mounting system 500 on the roof surface allows the installer to visualize where the pilot holes for locating a beam for installation of the lag bolt 10 should be drilled. If the holes are drilled too close to a drip edge, then the chemical flashing formed may be less compromised due to the presence of the drive edge. Thus, alignments tabs 537 can allow the installer to determine an optimal location for mounting of the system such that use of planar flashing and/or modification can be avoided. Alignment tabs 537 can also be used to determine whether any penetrations made in an up-roof direction for any reason fall within the optimal sealing area of the chemical flashing.

In another aspect, the mounting plates can be configured with one or more orienting features that faciliate proper positioning of the mounting plate with the mounting plate when interfaced. Such features can include any of those described herein, including various protrusions or extensions that interface with lateral notches 24 or drainage cut-outs 23. In some embodiments, however, these features can include one or more posts 522 that extend upwards an engage coupling orifice 22 within mounting puck 22. In this embodiment, posts 522 are defined with a plus-sign cross section and taper inwardly so as to be received within the corresponding coupling orifices 22. These features can further facilitate engagement between mounting plate 510 and mounting puck 20 by engaging a threaded inside surface of the coupling orifices 22.

As shown in FIG. 8A, conventional mounting puck 20 includes three coupling orifices 22 distributed about through-hole 21 that are adapted for coupling with a support arm or leveling foot (as shown in FIG. 1A). Each coupling orifice 22 includes a threaded interior such that tightening a threaded bolt extending through the support arm or leveling foot engages upper portion 22a of the threaded interior to secure the support arm or leveling foot to mounting puck 20. As can be seen in FIG. 8B, the threaded portion extends to lower portion 22b as well and can be accessed from an interior of mounting puck 20. Orienting posts 522 can be dimensioned so as to engage an interior of these coupling orifice 22 within lower portion 22b such there is little or no interference with the engagement of any bolts with upper region 22a when installing the leveling foot. One advantage of using such orienting posts 522 is that drainage cut-outs 23 along the bottom down-roof edge of mounting puck 20 can remain free to allow drainage of any water accumulating under mounting puck 20

To further provide improved drainage, mounting plate 510 can include one or more chevrons 513 or angled walls 514 that direct any runoff from up-roof away from through-hole 511 and any associated roof penetrations. Mounting plate 510 can further include a raised portion 512 surrounding through-hole 511 to further inhibit flow of runoff into the penetration below through-hole 511. It is appreciated that these features could be incorporated into any of the mounting plates described herein.

In yet another aspect, it can be desirable for mounting plates that allow mounting puck 20 to be "overseated" such that mounting puck sits at a shallower pitch than the roof on which it is mounted. Since the downardly directed loads from supporting the PV modules are directed primarily to the down-roof portion of mounting puck 20, the down-roof edge can depress or cut into the shingled roof surface. Thus, these loads can be better distributed if the mounting puck is overseated. In various embodiments, mounting plate is adapted to interface with the mounting puck so that when mounted on the roof, the mounting puck is overseated as described above An overseated mounting of mounting puck 20 can be accomplished by defining the top surface of mounting plate against which mounting puck interfaces to angle at a shallower pitch than that of the roof surface. In various embodiments, this is achieved by use of a mounting plate with a down-roof portion that is thicker or taller than an up-roof portion. Mounting plate 510 can also include a reduced height up-roof portion 522 and/or an increased height down-roof portion. In various embodiments, such as those in which mounting plate is formed in an injection molding process, it is desirable if the mounting plate is designed so that a wall thickness is consistent throughout so as to avoid deformation due to differing rates of shrinkage in areas of differing wall thickness. To allow for a down-roof portion of increased thickness while still allowing for consistent wall thickness in the component, mounting plate can include a series of meandering walls 520b that extend from the top surface that engages mounting puck 20 to a bottom surface of mounting plate 511 adjacent the roof surface, such as shown in FIG. 9A. This configuration allows for the increased height in the down-roof portion, without requiring the an actual increase in wall thickness.

Meandering walls 520b also provide further reinforcement in the down-roof portion against which the down-roof side of mounting puck 20 is engaged. Mounting plate includes a contoured region 520 that is angled upwards in a down-roof direction to provide the overseated mounting of mounting puck 20 and also define underside cavity 530 in which chemical flashing is formed. As can be seen in the enlarged detail in FIG. 9A, the contoured region 520 defines a sloped planar surface 520a that is about flush with a top surface of meandering walls 520b, thereby providing the shallower pitched surface against which mounting puck 20 is engage.

While the concepts described herein have been discussed in regard to a mounting plates adapted to allow retrofit of a conventional mounting puck, it is appreciated that such mounting plates can be used with various differing types of mounting pucks. These include modified mounting pucks adapted to include additional features to facilitate mounting and formation of a chemical flashing. It is further understood that such mounting pucks or shells can be modified so that various features described herein are integral with the puck. Such configurations also allow for mounting without use of traditional planar flashing or a separate mounting plate.

Figure 10A:
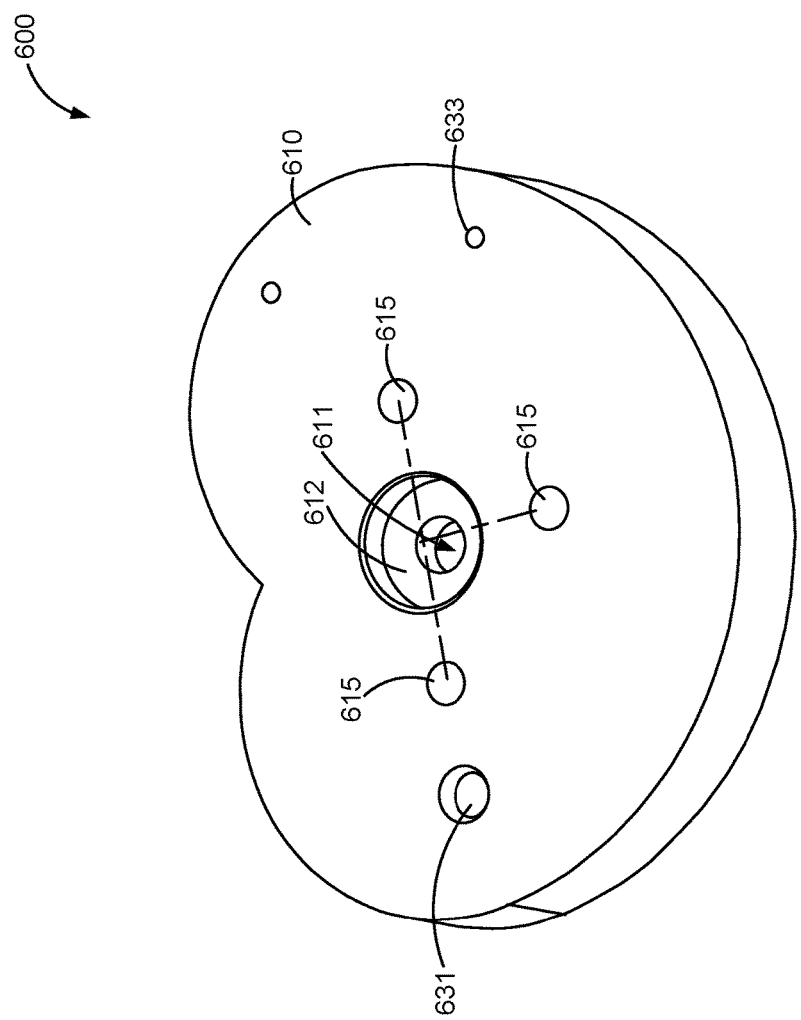
FIGS. 10A-10C illustrate various views of a mounting puck having an integrated sealant injection inlet and distribution channels in accordance with various embodiments.
Figure 10B:
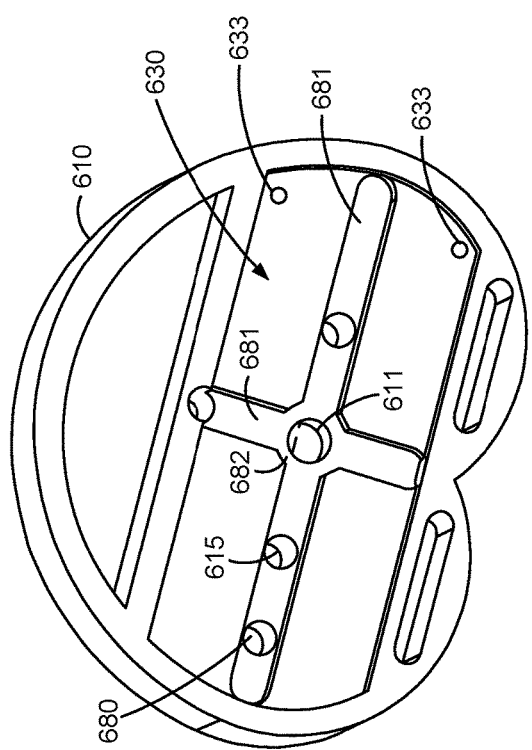
Figure 10C:
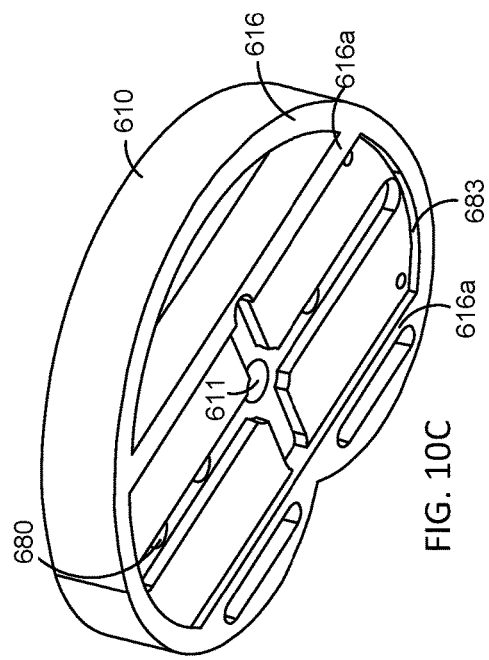

An example of such integrated embodiments is shown in FIGS. 10A-10C, which illustrate mounting puck 610 having integrated sealant injection features. Similar to other embodiments, mounting puck 610 is typically formed of a rigid, high strengh material suitable for withstanding substantial loads and stresses associated with supporting photovoltaic modules. In this embodiment, the flowable sealant is provided by an external injection means, such as a pressurized nozzle or caulking gun, after securing mounting puck 610 to the roof surface with a mechanical fastener inserted therethrough.

As shown in FIG. 10A, mounting puck 610 includes through-hole 611 extending from the top side and through the bottom side to allow passage of a mechanical fastener, such as a lag bolt, into the roof surface. Mounting puck 610 defines an underside cavity 630, as shown in FIG. 10B, in which the chemical flashing is formed, and a sealant injection inlet 631 in a top surface, as shown in FIG. 10A, that is accessible to an installer after mounting of puck 610 with a lag bolt. Inlet 580 can include an angled countersink or chamfer so as to fittingly receive a tapered tip of an injection means, such as a nozzle or caulking gun. Top surface of mounting puck 610 also includes three outlets 633 in fluid communication with underside cavity 630 such that after cavity 630 is filled any excess sealant extrudes out through one or more of outlets 633 providing a visual indicator to the installer that filling of cavity 630 with flowable sealant is complete. While in this embodiment, inlet 631 and oulets 633 are provided in the top surface, it is appreciated that inlet and outlets could be provided in a sidewall or various other locations as desired. In various embodiments, such integrated mounting plates can include additional features, such as injection nozzles or sealant gaskets, or any of the features described herein.

Mounting puck 610 further includes a recessed shoulder region 612 against which a mechanical fastener head can engage when torqued into the roof surface. Mounting puck 610 further includes multiple support coupling features 615 in varying locations along the top surface, each adapted for securely coupling with corresponding coupling features of a support arm or leveling foot, as described in any of the embodiments described herein.

As shown in FIGS. 10B-10C, an underside of mounting puck 610 includes guide channel 681 that extends from inlet 631 to the underside opening of through-hole 611 to guide flow of sealant around through-hole 611 to seal any associated roof penetrations. Channel 681 includes enlarged area 682 surrounding through hole 611 to ensure sealant flows sufficiently about the lag hole. Mounting puck 610 can further include recessed portion 683 bounded by outer perimeter 616 that contacts the roof surface. Recessed portion 683 can be recessed by a relatively short distance (e.g. 1 mm to 20 mm) and can further include channel 681, which is recessed even further. Recessed portion 683 helps ensures formation of a flowable sealant of a suitable thickness over the area surrounding about the lag hole so that cured sealant forms a durable chemical flashing. Recessed portion 683 can be further bound by internal walls 616a that further refine the size and shape of any chemical flashing formed. Such a configuration contains the sealant as any excess sealant that flows beyond the cavity defined by recessed portion 683 can be contained by outer perimeter 616. Any excess sealant flows out through outlets 633 once cavity 630 is filled providing a visual indication to the installer that sealant injection is complete.

The embodiments of the present inventions are not to be limited in scope by the specific embodiments described herein. For example, although many of the embodiments disclosed herein have been described with reference to composite shingle roofs, the principles herein may be equally applicable to other types of roofs. Indeed, various modifications of the embodiments of the present inventions, in addition to those described herein, will be apparent to those of ordinary skill in the art from the foregoing description and accompanying drawings and claims. Thus, such modifications are intended to fall within the scope of this invention. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, this disclosure should be construed in view of the full breath and spirit of the embodiments of the present inventions as disclosed herein and claimed below.

What is claimed is:

1. A photovoltaic mounting system for mounting photovoltaic modules on a roof surface, the system comprising:
   a mounting shell adapted to couple with and support a mounting bracket supporting a photovoltaic module coupling device, wherein the mounting shell includes a through-hole for insertion of a mechanical fastener, a bottom side facing towards the roof and a top side facing away from the roof when mounted thereon, the bottom side having an outer bottom perimeter adapted for placement against a planar roof surface and the top side having a set of coupling orifices for coupling with the mounting bracket; and
   a mounting plate adapted to interface with the bottom side of the mounting shell and having a through-hole for passage of the mechanical fastener, wherein the mounting plate comprises at least one inlet accessible from outside the mounting shell when interfaced with the mounting plate mounted against the roof surface with the mechanical fastener extending through the through-hole of each of the mounting shell and the mounting plate, the at least one inlet comprises a nozzle extending upwardly from the mounting plate thereby protruding away from the roof surface when the mounting plate is mounted to the roof surface to facilitate insertion of a distal tip of a caulking or sealant gun such that a flowable sealant is injectable into a cavity between the mounting plate and the roof surface from outside the mounting shell after mounting of the mounting system on the roof surface to allow formation of a chemical flashing,
   wherein the mounting plate is dimensioned to allow for mounting of the mounting shell on the roof surface without an underlying planar flashing interleaved with an up-roof course of shingles and without removal or cutting of shingles of the roof surface.

2. The photovoltaic mounting system of claim 1, wherein the mounting plate is adapted to interface with the mounting shell, wherein the mounting shell comprises a conventional, off-the-shelf mounting puck.

3. The photovoltaic mounting system of claim 1, wherein the top surface of the mounting plate includes a plurality of protrusions that interface with a plurality of coupling features of the mounting shell adapted for coupling to the mounting support, wherein the plurality of protrusions are arranged to orient or couple the mounting plate to the mounting shell.

4. The photovoltaic mounting system of claim 1, wherein the mounting plate includes a contoured region that defines the cavity and is received within the mounting shell, wherein the contoured region defines a guide channel extending from the at least one inlet towards the through-hole to facilitate flow of the flowable sealant around any roof surface penetrations near the through-hole during mounting.

5. The photovoltaic mounting system of claim 1, wherein the system further includes a sealant gasket circumscribing a perimeter along a bottom roof facing side of the mounting plate to seal the cavity between the mounting plate and the roof surface during injection of flowable sealant after mounting.

6. The photovoltaic mounting system of claim 5, wherein the sealant gasket is a foam ring defined in a shape corresponding to the cavity and secured to the mounting plate with an adhesive.

7. The photovoltaic mounting system of claim 1, wherein the mounting plate further comprises an outlet in fluid communication with the cavity and extending outside the mounting shell when interfaced with the mounting plate to allow flow of excess sealant out from the cavity when filled.

8. The photovoltaic mounting system of claim 7, wherein the outlet is included within one or more outlets, wherein a total cross-sectional area of the one or more outlets is less than that of the inlet to facilitate filling of the cavity.

9. The photovoltaic mounting system of claim 7, wherein the at least one inlet comprises a size and shape suitable for insertion of a distal tip of a standard, off-the-shelf caulking or sealant gun.

10. The photovoltaic mounting system of claim 7, wherein the mounting plate, the at least one inlet and the outlet are integrally formed of a single sheet of metal or a continuous piece of plastic.

11. The photovoltaic mounting system of claim 1, wherein the mounting shell comprises a down-roof drainage cut-out along a most down-roof portion of a bottom edge of the mounting shell.

12. A photovoltaic mounting system for mounting photovoltaic modules on a roof surface, the system comprising:
    a mounting shell adapted to couple with and support a mounting bracket supporting a photovoltaic module coupling device, wherein the shell includes a through-hole for insertion of a mechanical fastener and a bottom roof facing side having an outer bottom perimeter adapted for placement against a planar roof surface and a top side facing away from the roof when mounted thereon and having a set of coupling orifices for coupling with the mounting bracket, and
    a mounting plate adapted to interface with the mounting shell and having a through-hole for passage of the mechanical fastener,
    wherein the mounting plate includes a contoured region that defines a cavity between the roof surface and the mounting plate that surrounds the through-hole and includes an inlet in fluid communication with the cavity that is accessible from outside the shell when interfaced with the mounting plate mounted against the roof surface with the mechanical fastener extending through the through-hole of each of the mounting shell and the mounting plate into the roof surface, the inlet comprises a nozzle extending upwardly from the mounting plate thereby protruding away from the roof surface when the mounting plate is mounted to the roof surface to facilitate insertion of a distal tip of a caulking or sealant gun and to facilitate flow of sealant into the cavity and formation of a chemical flashing after mounting of the mounting system to the roof surface, wherein the mounting plate is dimensioned so that substantially the entire outer perimeter thereof is within about 5 inches or less from the perimeter of the bottom roof facing side of the mounting shell so as to allow mounting of the mounting shell on the roof surface and sealing of any roof penetrations with the chemical flashing without an underlying planar flashing interleaved with an up-roof course of shingles and without removal or cutting of shingles of the roof surface.

13. The photovoltaic mounting system of claim 12, wherein the mounting plate further comprises an outlet in fluid communication with the cavity and arranged to allow flow of excess sealant therethrough when the cavity is substantially filled.

14. The photovoltaic mounting system of claim 12, wherein the mounting plate includes one or more ribs protruding into the cavity and extending in a direction transverse to a sealant flow path extending between the inlet and the outlet so as to inhibit flow of sealant towards the outlet thereby facilitating filling of the cavity.

15. The photovoltaic mounting system of claim 14, wherein the ribs include gapped regions around the through-hole of the mounting plate so as to facilitate sealing about any mechanical fastener extending through the through-hole of the mounting plate.

16. The photovoltaic mounting system of claim 12,
wherein a top surface of the mounting plate is shaped to interface with the shell and includes an engagement surface that extends along an angled plane such that, when mounted on the roof surface, a down-roof side of the perimeter of the bottom-facing side of the shell is supported further from the roof surface than an up-roof side of the perimeter of the bottom-facing side of the of the shell.

17. The photovoltaic mounting system of claim 16,
wherein a down-roof portion of the engagement surface is defined by a plurality of meandering walls so as to reinforce the down-roof portion of the mounting plate against loading forces applied by the shell when supporting a photovoltaic module.

18. The photovoltaic mounting system of claim 12, wherein substantially the entire outer perimeter of the mounting plate is less than 3 inches from the bottom perimeter of the mounting shell.

19. The photovoltaic mounting system of claim 12, wherein substantially the entire outer perimeter of the mounting plate is less than 1 inch from the bottom perimeter of the mounting shell.

20. A photovoltaic mounting system for mounting on a roof surface, the system comprising:

a mounting shell adapted to couple with and support a mounting bracket supporting a photovoltaic module coupling device, wherein the shell includes a through-hole for insertion of a lag bolt, a bottom side facing towards the roof and a top side facing away from the roof when mounted thereon, the bottom side having an outer bottom perimeter adapted for placement against a planar roof surface and the top side having a set of coupling orifices for coupling with the mounting bracket;

a mounting plate adapted to interface with the mounting shell and having a through-hole for passage of the lag bolt, wherein the mounting plate defines a cavity between the mounting plate and the roof surface and an inlet in fluid communication with the cavity that is accessible from outside the mounting shell when interfaced with the mounting plate mounted against the roof surface with the lag bolt extending through the through-hole of each of the mounting shell and the mounting plate, the inlet comprises a nozzle extending upwardly from the mounting plate thereby protruding away from the roof surface when the mounting plate is mounted to the roof surface to facilitate insert of a distal tip of a caulking or sealant gun so as to allow injection of flowable sealant for formation of a chemical flashing within the cavity after mounting of the mounting system to the roof surface, wherein the mounting plate is dimensioned to allow for mounting of the mounting shell on the roof surface without an underlying planar flashing interleaved with an up-roof course of shingles and without removal or cutting of shingles of the roof surface; and a gasket disposed along an interface between the mounting plate and the roof surface so as to seal the cavity during injection of sealant after mounting.

21. The photovoltaic mounting system of claim 20, wherein the mounting plate further comprises one or more outlets in fluid communication with the cavity that extends outside the mounting shell when interfaced with the mounting plate with the mounting plate against the roof surface so that any excess sealant is extruded through the one or more outlets and is visible to an installer as an indicator that the cavity is substantially filled.

22. The photovoltaic mounting system of claim 20, wherein the mounting plate includes one or more pairs of visual alignment indicators outwardly visible when the mounting shell is interfaced with the mounting plate, wherein the one or more pairs indicate an outer bounds of the cavity in which the chemical flashing is formed so as to facilitate placement of the mounting system over and sealing of any roof penetrations.

23. The photovoltaic mounting system of claim 20, wherein the gasket is a compressible foam so as to seal a bottom perimeter of the mounting plate from any uneven roof surface and prevent leakage during injection of the flowable sealant into the cavity.

* * * * *